(12) United States Patent
Hashimoto et al.

(10) Patent No.: US 6,390,538 B1
(45) Date of Patent: May 21, 2002

(54) IMPACT ABSORBING MEMBER FOR VEHICLE INTERIOR

(75) Inventors: Yoshihiko Hashimoto, Ibaraki; Nagayoshi Adachi, Takarazuka; Tetsuo Mekata, Sanda; Kazushi Nakatani, Suita; Junji Miyano, Takatsuki; Miwa Ishii, Kawanishi; Junko Yoshida, Settsu, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/708,511

(22) Filed: Nov. 9, 2000

(30) Foreign Application Priority Data

Nov. 12, 1999 (JP) .......................................... 11-322778
Nov. 25, 1999 (JP) .......................................... 11-334397

(51) Int. Cl.$^7$ .............................................. B62D 25/04
(52) U.S. Cl. ....................... 296/189; 296/39.1; 280/751
(58) Field of Search ................................ 296/39.1, 188, 296/189, 146.6, 146.7, 203.03, 203.01; 280/748, 751, 752

(56) References Cited

U.S. PATENT DOCUMENTS

| | | | | |
|---|---|---|---|---|
| 5,741,044 A | * | 4/1998 | Kawai et al. | 296/189 X |
| 5,833,303 A | * | 11/1998 | Kawai et al. | 296/189 |
| 5,927,786 A | * | 7/1999 | Kawai et al. | 296/39.1 |
| 6,050,631 A | * | 4/2000 | Suzuki et al. | 296/189 |
| 6,059,342 A | * | 5/2000 | Kawai et al. | 296/39.1 |
| 6,126,231 A | * | 10/2000 | Susuki et al. | 296/189 |
| 6,247,287 B1 | * | 6/2001 | Takabatake | 296/188 X |

* cited by examiner

Primary Examiner—Joseph D. Pape
(74) Attorney, Agent, or Firm—Armstrong, Westerman & Hattori, LLP

(57) ABSTRACT

An impact absorbing member for vehicle interior that has improved impact resistance and sufficiently meets the abovementioned safety standard while maintaining a superior heat deformation property, and that has a reduced rib protrusion height and therefore entails a reduced amount of projection in to the vehicle interior space, wherein the above vehicle interior material is molded using synthetic resin regarding which the tan δ (loss tangent) peak height is 0.04 or higher and the peak temperature is −40° to 50° C., as obtained through viscoelasticity measurement.

11 Claims, 15 Drawing Sheets

PASSENGER POSITION

INSIDE VEHICLE INTERIOR SPACE (a)

(b)

(a)

(b)

(a)

(b)

(a)

(b)

FRONT SEAT | VEHICLE COMPARTMENT INTERIOR | BACK SEAT (a)

(b)

IMPACT ABSORBING MEMBER FOR VEHICLE INTERIOR

BACKGROUND OF THE INVENTION

1. Field of the Invention

The present invention relates to a vehicle interior material, and more particularly to an impact absorbing member for vehicle interior suitably used for pillar garnish, roof side rail garnish, door waist garnish, etc., in an automobile.

2. Description of the Related Art

Polypropylene resins and rubber-enhanced styrene resins (ABS, AES, AAS) are widely used for the housings and components of home electric appliances, vehicle interiors and exteriors, etc., due to their superior impact-resistance, heat deform ability, and ease of molding.

On the other hand, vehicle interior materials include, as shown in FIG. 15, front pillar garnish 105F, center pillar garnish 101C and roof side rail garnish 101S that are respectively mounted to the vehicle interior side of the front pillar 105F, the center pillars 105C and roof side rails 105S. These vehicle interior materials are constructed not only in order to maintain the aesthetic appearance of the vehicle interior, but also to allow the impact received by a passenger from the vehicle body to be absorbed and reduced through plastic deformation at the area that comes into direct contact with a part of the passenger's body (i.e., the head) during a collision of the vehicle, for example.

A typical conventional front pillar garnish 105F comprises, as described in Japanese Patent Application Laid-Open No. H9-175284, (i) a surface member 102 having an essentially C-shaped transverse cross-section, (ii) a panel-like vertical rib 103L that extends along the length of and along the rear surface of the surface member 102, and (iii) multiple panel-like horizontal ribs 103W that are essentially perpendicular to the vertical rib 103L and extend between the side walls of the surface member 102, as shown in FIG. 16 for example, and is fixed to the protrusion 107 of the inner panel comprising the front pillar 105F such that the ribs are in contact with the protrusion 107. In the event of a passenger collision, the impact is absorbed by the vertical rib 103L and the horizontal ribs 103W, which deform and become destroyed.

Incidentally, increased safety during vehicle collisions has been demanded in recent years in the United States. Impact absorption characteristics that meet a high safety standard in terms of HIC (head impact characteristic) provided by the FMVSS, a U.S. government agency, are demanded of molded products used in vehicle interiors or exteriors.

Various attempts have been made in order to meet this safety standard, as well as to maintain heat deformability and ease of molding, and the use of ABS resin using diene rubber and modified polypropylene as the molding materials has been proposed, but in any event, sufficient impact absorption characteristics have not yet been obtained.

In order to maintain a high level of impact absorption performance, the protrusion height of each rib must be large. Consequently, when the front pillar garnish 101F is mounted to the front pillar 105F, the front pillar garnish 101F projects out into the vehicle interior gap to a significant extent, giving rise to such problems that the passenger feels closed in, the field of view is narrowed, and the garnish poses an obstacle when the passenger enters and exits the vehicle.

SUMMARY OF THE INVENTION

In view of the problems identified above, an object of the present invention is to provide an impact absorbing member for vehicle interior that, while maintaining superior heat deformability, offers improved impact resistance that satisfies the above safety standard, reduces the protrusion height of the ribs, and reduces the degree to which the material projects into the vehicle interior space.

In order to attain these objects, the vehicle interior material pertaining to the present invention may be obtained by molding synthetic resin that has a tan δ (loss tangent) peak height of 0.04 or higher and a peak temperature between −40 and 50° C., as measured through viscoelasticity measurement. The impact absorbing member for vehicle interior of the present invention is suitable for use as a pillar garnish, roof side rail garnish or door waist garnish of an automobile.

The reason why the present invention has superior impact-resistance while maintaining heat deformability, and consequently can have a reduced rib protrusion height, will be explained below using pillar garnish as an example, based on the U.S. FMVSS201 standard.

First, the kinetic energy $E_0$ (J) of a dummy head (virtual passenger's head) is expressed by the following equation (1) based on the equation of motion.

$$E_0 = \tfrac{1}{2}mv^2 \tag{1}$$

Here, m is the weight of the dummy head (4.6 kg), and v is the velocity (m/s) of the dummy head at the time of collision.

The dynamic energy W(J) absorbed by the deformation of the ribs is expressed by the following equation (2).

$$W = m \cdot \alpha_{CONST} \cdot S \tag{2}$$

Here, $\alpha_{CONST}$ is the average acceleration (m/s$^2$) that is generated at the time of collision, and S is the amount of stroke (m).

Conventional vehicle interior materials are generally molded using a synthetic resin such as a polypropylene resin or a rubber-enhanced styrene resin (ABS, AES, AAS), and when the dummy head collides with the material, most of the kinetic energy $E_0$ is absorbed through the structural deformation of the ribs, as described above. As a result, the equation (1) and the equation (2) are deemed equal, and the following equation (3) is obtained.

$$m \cdot \alpha_{CONST} \cdot S = E_0 \tag{3}$$

As shown in FIG. 2(a), the dummy head's kinetic energy $E_0$ is efficiently absorbed by the deformation of the ribs, the HIC(d) requirement is met, and the stroke becomes the smallest when there is no curve gradient caused by a rising or falling rate of acceleration, and the acceleration in between is constant.

On the other hand, the head injury characteristic HIC(d) provided by the U.S. FMVSS201 standard is calculated based on the following equation (4).

$$(4) \quad HIC(d) = 0.75446 \times \left( \frac{1}{t_2 - t_1} \int_{t_1}^{t_2} \alpha \, dt \right)^{2.5} \times (t_2 - t_1) + 166.4 \tag{4}$$

If the following equations are substituted in the equation (4) and calculated, the following equation (5) is obtained.

$$\alpha = \alpha_{CONST}/g$$

$$g = 9.8 \text{ (m/s}^2) \text{ [gravitational acceleration]}$$

$$t_2 - t_1 = V_0/\alpha_{CONST}$$

$V_0 = 6.67$ (m/s) [15 mph (miles/h)]

$$\alpha_{CONST} = (HIC(d) - 166.4)/0.0167377)^{0.667} \quad (5)$$

Given that the HIC(d) level currently adopted as an internal standard by automobile manufacturers is 800 or less, and that the energy that can be absorbed by the distortion of the body panels (pillar outers, pillar inners, etc.) is approximately 100 in terms of HIC(d), the HIC(d) that should be substituted in the equation (5) when seeking the limit of the average acceleration is 900. If the average accelerate $\alpha_{CONST}$ is 1247.5 (ms$^2$) or lower, the above standard is met.

If the equation (3) is calculated using this average acceleration $\alpha_{CONST}$, the smallest value for the stroke amount S becomes 17.8 (mm), and therefore, it is seen that where a conventional vehicle interior material is concerned, the rib height must be 17.8 mm or more.

In addition, because the parts m and n that exist when the acceleration is rising and falling, respectively, are added, as shown in FIG. 2 (b), to the acceleration actually measured for the dummy head, the stroke amount S, i.e., the required rib height, increases further, resulting in an actual rib height of 18 to 19 mm or higher.

Incidentally, at the time of the collision of the dummy head, only a small part of the kinetic energy $E_0$ is converted into loss energy such as heat energy. If the amount of this loss energy can be increased, the following equation (6) is obtained instead of the equation (3). It is therefore seen that by increasing the energy loss rate k, the average acceleration $\alpha_{CONST}$ to be absorbed via the deformation, destruction, etc. of the ribs decreases, and further, HIC(d) may be reduced. This equation (6) indicates, as shown in Table 1 below, that by increasing the energy loss rate k under a constant average acceleration $\alpha_{CONST}$, the required stroke amount S is reduced, and the rib height may be further reduced.

$$m \cdot \alpha_{CONST} \cdot S = (1-k)E_0 \quad (6)$$

k indicates the rate of energy loss.

TABLE 1

| Energy loss rate k | Dynamic energy W (J) | Required stroke amount S (mm) |
|---|---|---|
| 0 | 102.32 | 17.8 |
| 0.05 | 97.19 | 16.9 |
| 0.1 | 92.07 | 16 |
| 0.15 | 86.96 | 15.2 |

Accordingly, as means for increasing this energy loss rate k, the present invention focuses on the tan δ (loss tangent), as obtained via viscoelasticity measurement, of the synthetic resin from which the vehicle interior material is molded. It reduces HIC (d), or in other words, increases the impact resistance, and reduces the stroke amount of the ribs, making it thus possible to reduce the required rib height by increasing the peak height of this tan δ to a value equal to or higher than 0.04 to promote micro-Brownian motion among the segments of the molded polymer material, thereby increasing the loss energy based on dynamic heat generation It is preferred that the synthetic resin used to mold the impact absorbing member for vehicle interior of the present invention comprise a polypropylene resin, a rubber-enhanced styrene resin, a polycarbonate resin, a polyamide resin, a polyester resin or a polyphenylene ether resin, or an alloy resin combining these resins.

These resins have conventionally been used as vehicle interior materials, but their tan δ in the test temperature range (19–26° C.) defined by the U.S. standard FMVSS201 is around 0.02 to 0.03, and their loss energy due to heat generation is negligible.

In the present invention, by using these synthetic resins as the base resin, and by adding a norbornane polymer, a styrene-isoprene-styrene block copolymer, a hydrogen-added styrene-isoprene-styrene block copolymer, a styrene-isobutylene-styrene block copolymer, an isoprene-isobutylene copolymer, a chloroprene polymer, a (meth) acrylic ester resin, acrylonitryl-butadiene rubber, polyurethane, or silicone rubber, the tan δ peak height of the synthetic resin is made 0.04 or higher, and the loss energy during passenger collision is increased.

The above synthetic resin preferably has superior heat deformability by which the HDT (heat deformation temperature) under a 1.82 MPa load becomes 70° C. to 120° C., and for the above alloy resin, an alloy resin comprising a polycarbonate resin and a rubber-enhanced styrene resin, an alloy resin comprising a polyamide resin and a rubber-enhanced styrene resin, or an alloy resin comprising a polyester resin, a polycarbonate resin and a rubber-enhanced styrene resin, is preferred.

The impact absorbing member for vehicle interior obtained by molding these synthetic resins comprises a surface member having an essentially C-shaped transverse cross-section, that is placed over the vehicle interior side of the vehicle panel with a gap in between, and multiple plate-shape ribs that protrude into the abovementioned gap from the rear surface of the surface member that faces the vehicle panel, and wherein each plate-shape rib is independent of the others and extends between the side walls of the surface member such that they are perpendicular to the length of the vehicle panel, and has deformation inducing means that, when impact is received from a passenger, causes the part that protrudes toward the vehicle panel to buckle in the middle part of the protrusion, such that during passenger collision, multi-stage deformation and destruction occur in which buckling and deformation begin in the middle part of the rib before the rib buckles along the protrusion base edge, providing efficient impact absorption in which an essentially constant acceleration is maintained as shown in FIGS. 2(a) and 2(b), and enabling the stroke amount due to the deceleration slope to be further reduced.

It is preferred that the surface member be placed over the panel protrusion of the vehicle panel that protrudes into the interior of the vehicle, that the protrusion edge of each plate-shape rib have a configuration such that it essentially travels along the protrusion surface and one of the passenger-side side faces continuing on neither side thereof, with these two surfaces comprising the above panel protrusion, and wherein the deformation inducing means includes at least one main notch that opens up at a position at which the protrusion edge faces the two-surface contact edge between the protrusion surface and one of the passenger surfaces of the panel protrusion, and comprises a total of two or more components selected from among notches, steps and thin areas formed on said protrusion edge. In a plate-shape rib constructed in this fashion, the buckling that occurs in the middle part of the protrusion is induced along virtual lines that connect the bottoms of the notches, the bottom edges of the steps or the bottoms of the thin areas, and these bottoms and bottom edges may become the points from which additional fissures occur toward the surface member. The generation and progress of these fissures, including fissures in the thin areas, contribute to more efficient impact absorption.

While the abovementioned surface member and plate-shape ribs are integrally molded, the vehicle interior material pertaining to the present invention is not limited to this implementation: A material in which the surface member and the plate-shape ribs are molded separately using any of the synthetic resins described above, and are assembled into one integral unit using a bonding means such as clips, thermal caulking, an adhesive agent or two-sided adhesive tape is also desirable.

An impact absorbing member for vehicle interior having this construction is suitably used as a front pillar garnish or center pillar garnish of an automobile in particular.

DESCRIPTION OF THE PREFERRED EMBODIMENTS

The embodiments of the present invention are explained below in detail with reference to the accompanying drawings, but the present invention is not limited whatsoever by these embodiments.

Figure 1:
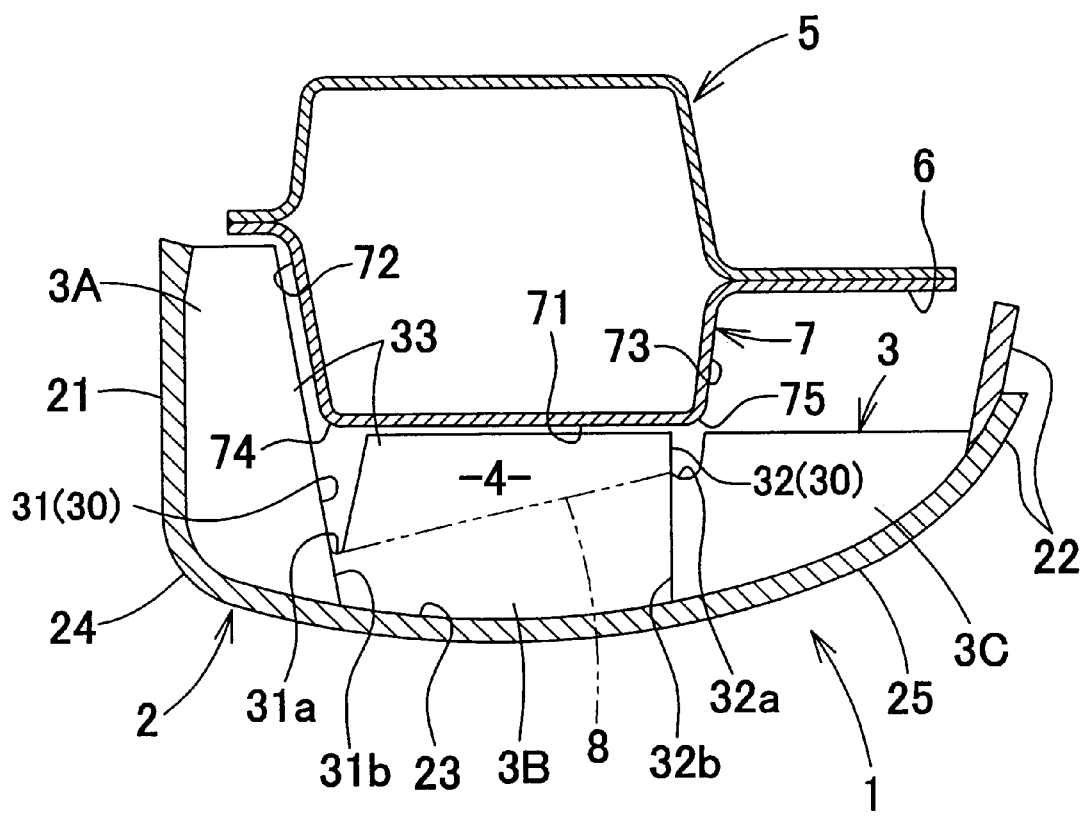
FIG. 1 is a cross-sectional view showing a pillar garnish comprising the impact absorbing member for vehicle interior of the first embodiment, which is mounted to a vehicle panel.
Figure 2:
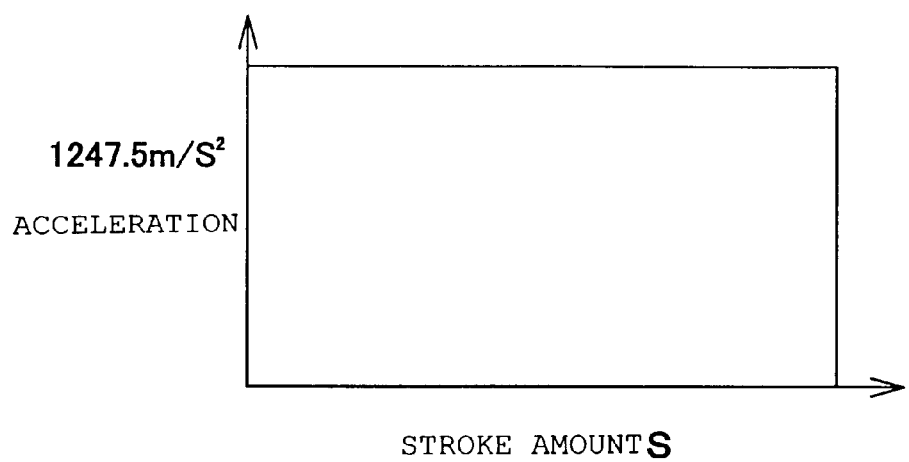
FIG. 2(a) shows an ideal energy absorption wave, in which the vertical axis represents the acceleration and the horizontal axis represents the stroke amount.
FIG. 2(b) shows an energy absorption waveform factoring in the rising and falling of acceleration, in which the vertical axis represents the acceleration and the horizontal axis represents the stroke amount.
Figure 2:
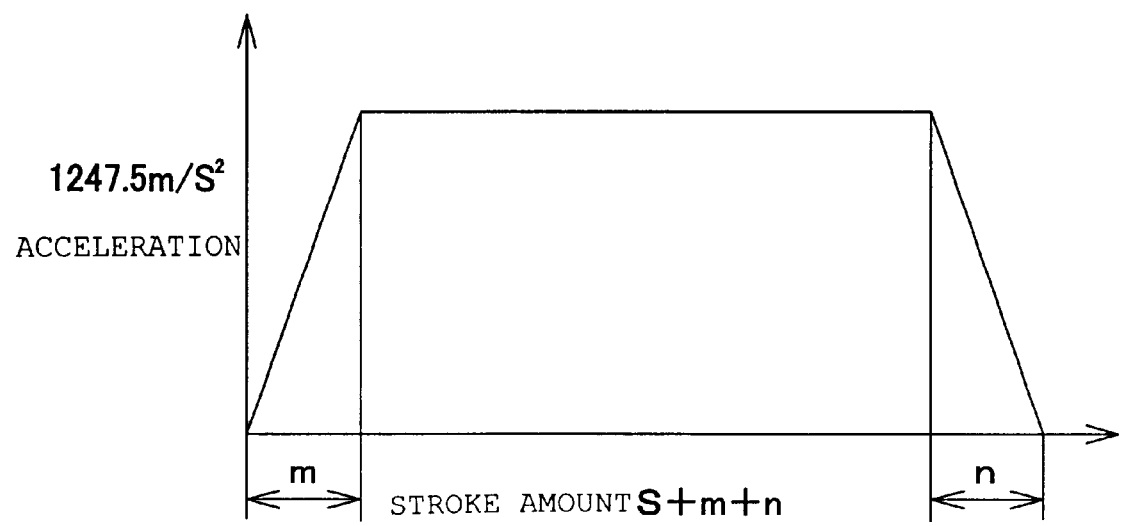
Figure 3:
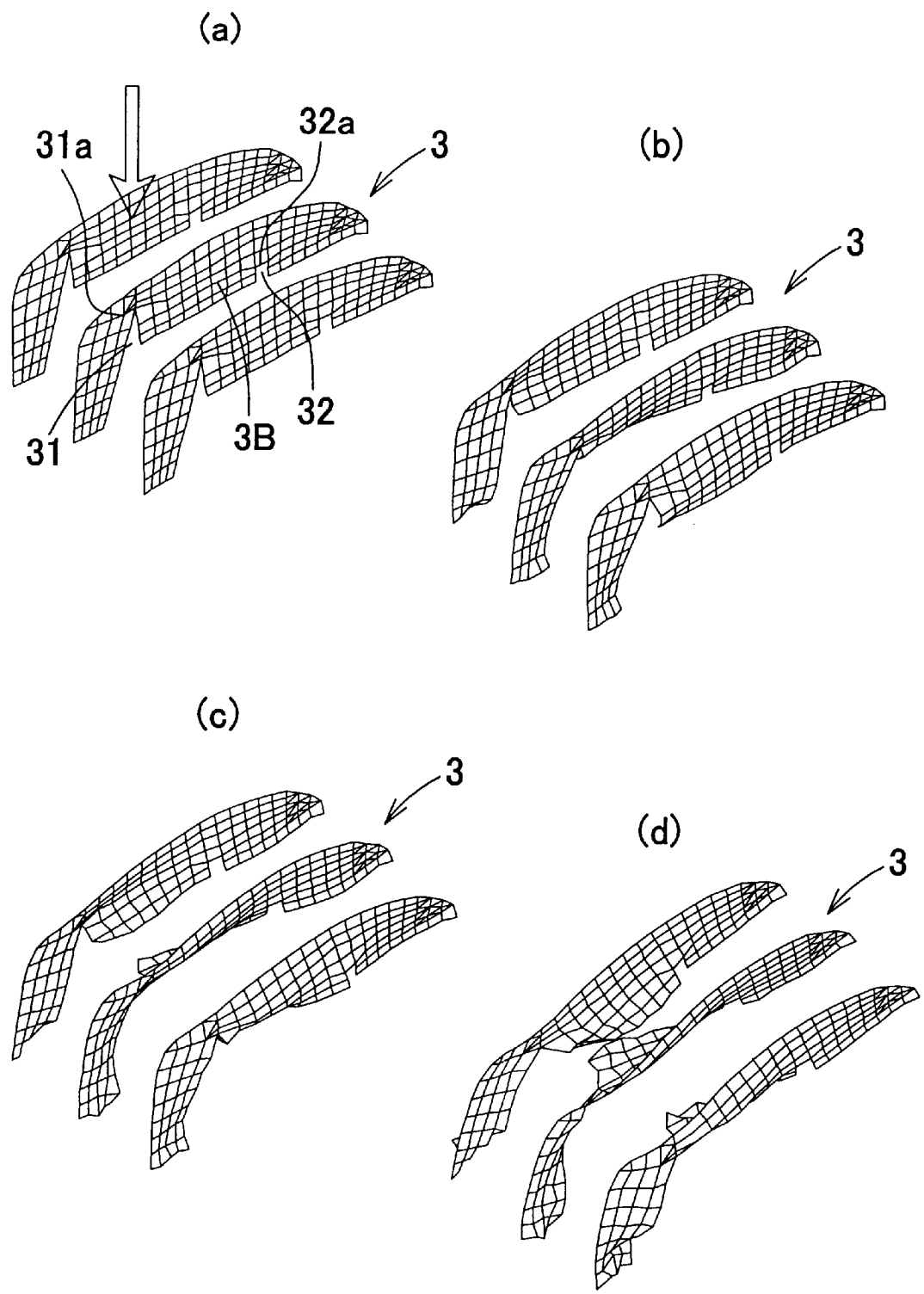
FIGS. 3(a) through 3(d) are drawings to explain the impact absorption when the pillar garnish receives an impact force.
Figure 4:
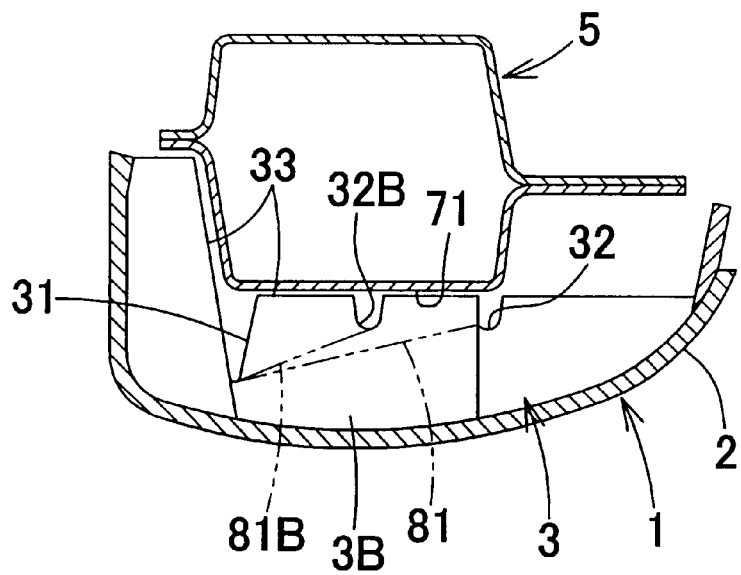
FIG. 4(a) is a cross-sectional view showing a variation in which each plate-shape rib of the pillar garnish has multiple auxiliary notches.
FIG. 4(b) is a cross-sectional view showing another variation in which each plate-shape rib has multiple auxiliary notches.
Figure 4:
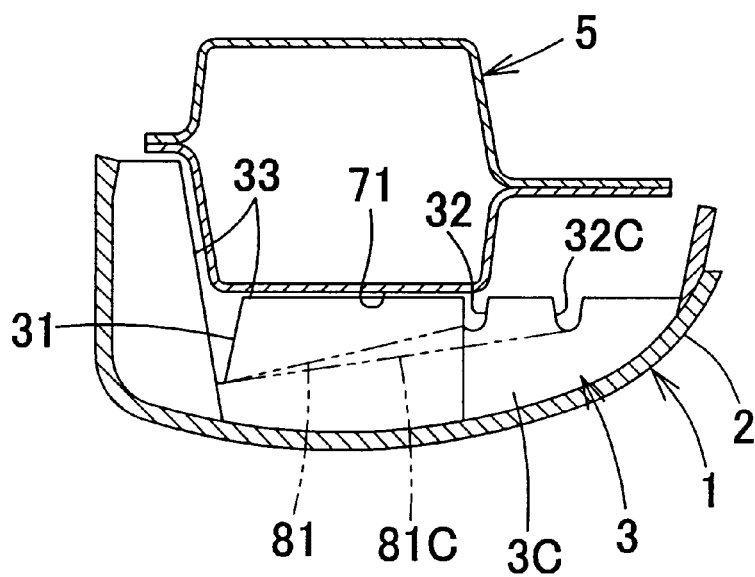
Figure 5:
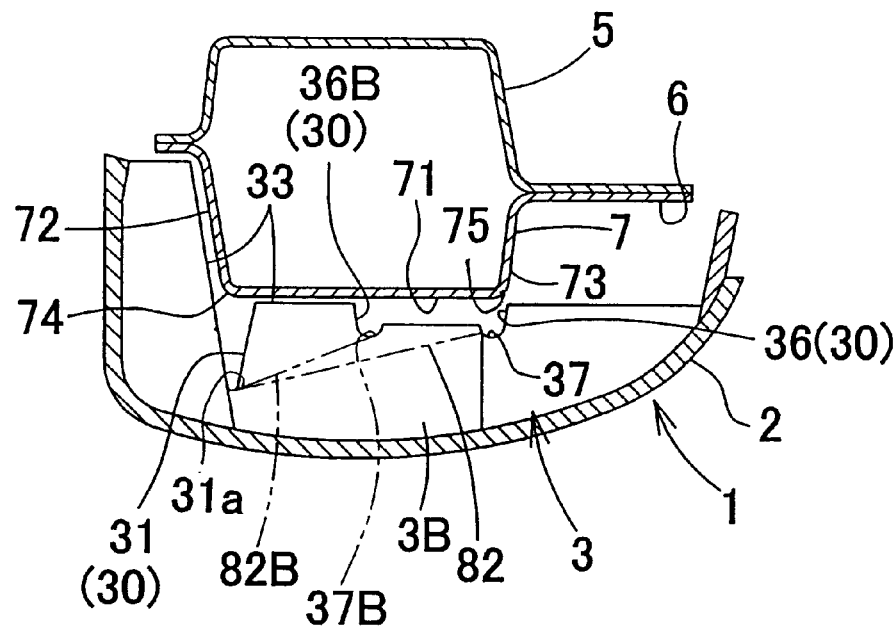
FIGS. 5(a) and 5(b) are cross-sectional views showing a pillar garnish comprising the impact absorbing member for vehicle interior of the second embodiment of the present invention, as mounted to a vehicle panel.
Figure 5:
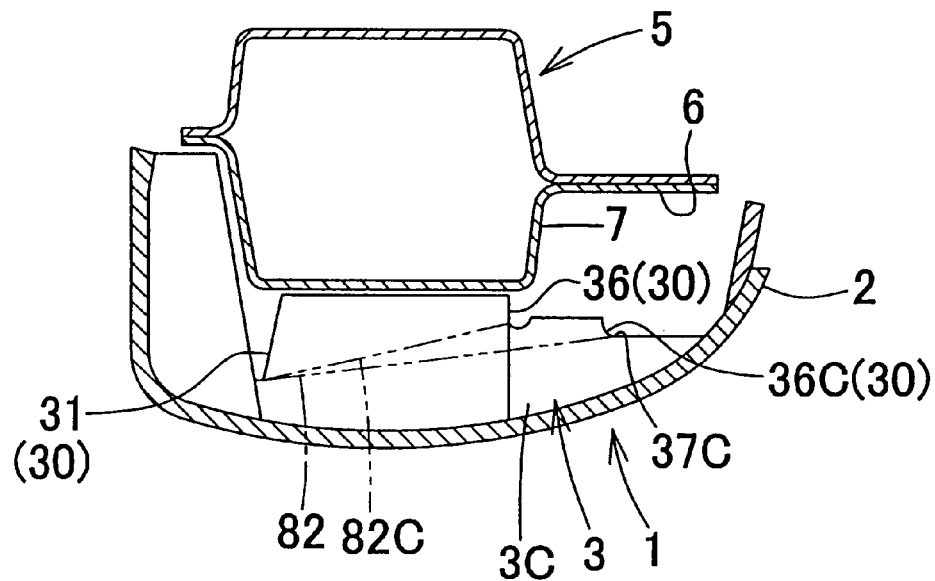
Figure 6:
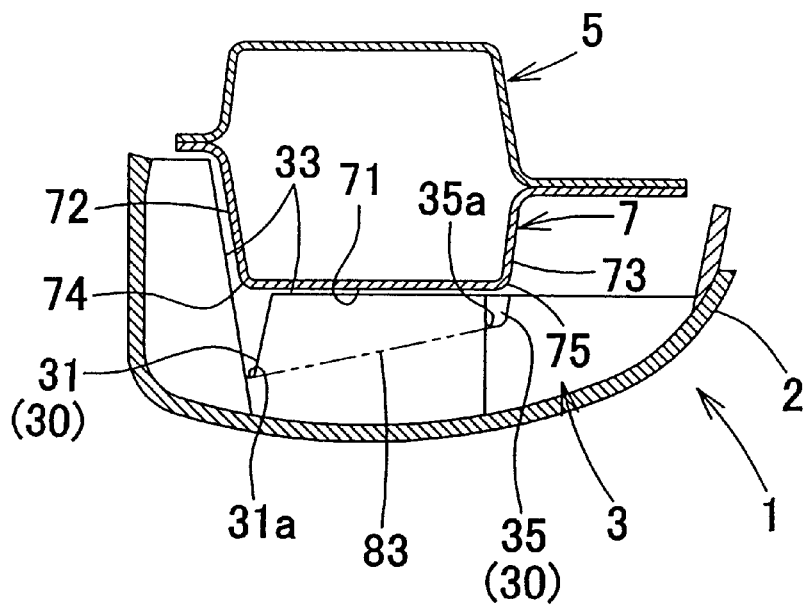
FIGS. 6(a) and 6(b) are cross-sectional views showing a pillar garnish comprising the impact absorbing member for vehicle interior of the third embodiment of the present invention, as mounted to a vehicle panel.
Figure 6:
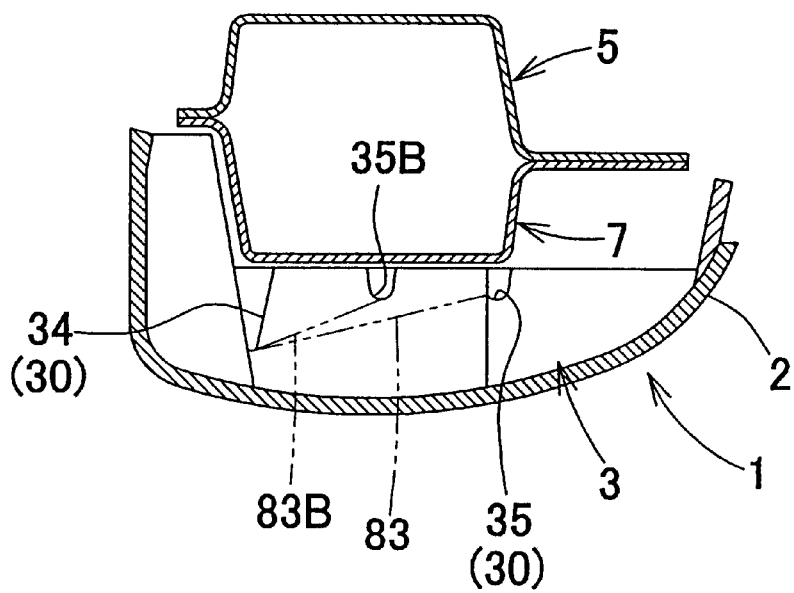
Figure 7:
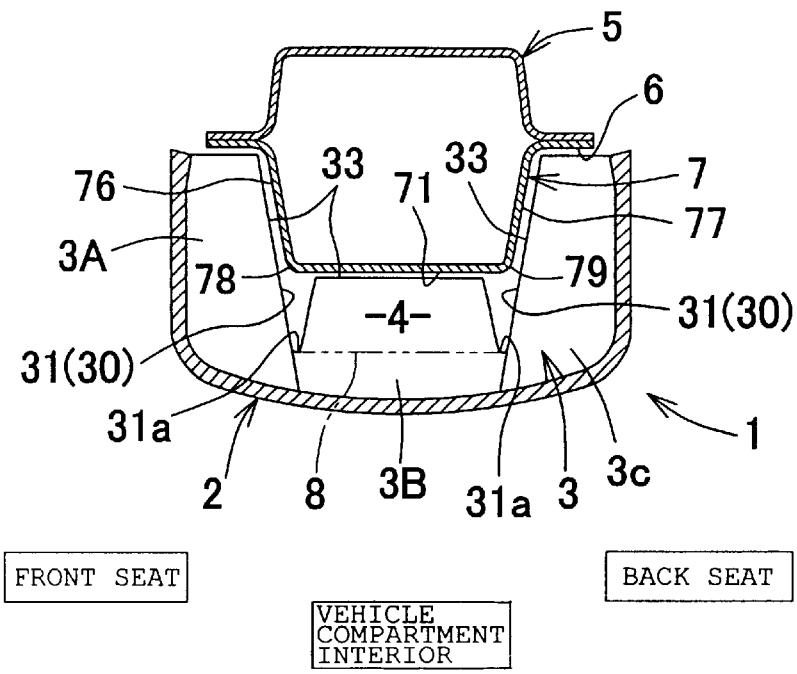
FIG. 7 is a cross-sectional view showing a pillar garnish comprising the impact absorbing member for vehicle interior of the fourth embodiment of the present invention, as mounted to a vehicle panel.
Figure 8:
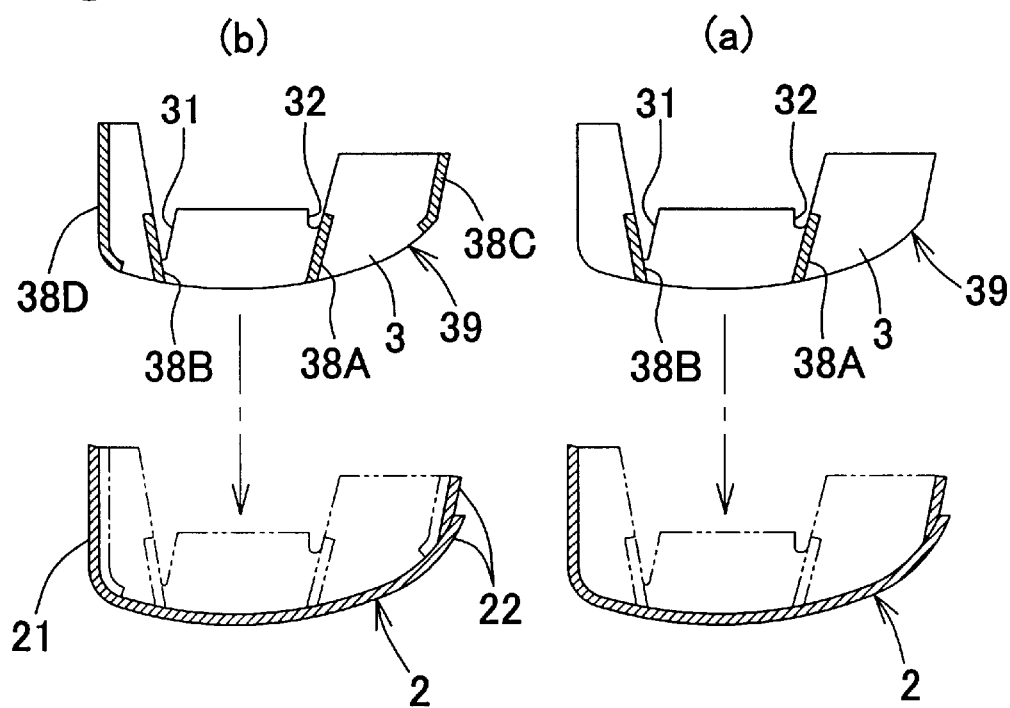
FIGS. 8(a) and 8(b) are cross-sectional views showing a pillar garnish comprising the impact absorbing member for vehicle interior of the fifth embodiment of the present invention, as mounted to a vehicle panel.

FIG. 1 is a drawing showing a pillar garnish 1, one example of the impact absorbing member for vehicle interior of the present invention, that is mounted to a vehicle panel 5. FIGS. 1, 3 and 4 show a first embodiment of the present invention, FIG. 5 shows a second embodiment, FIG. 6 shows a third embodiment, FIG. 7 shows a fourth embodiment, and FIG. 8 shows a fifth embodiment. In the drawings, the number 2 indicates the surface member, and the number 3 indicates the plate-shape ribs (transverse ribs).

First, the pillar garnish of the first embodiment of the present invention will be explained with reference to FIGS. 1, 3 and 4.

The pillar garnish 1 is a front pillar garnish comprising (a) an essentially C-shaped surface member 2 that comprises a section 24 that is bent when viewed in its transverse cross-section and a warped section 25, and that is placed, with an impact-absorbing gap 4 in between, over the panel protrusion 7 of the inner panel 6, which is a component of the vehicle panel 5 of the front pillar area, the above panel protrusion 7 comprising (i) a protrusion surface 71 that protrudes into the vehicle interior and extends along the vehicle length and (ii) two side surfaces 72 and 73 that are located on either side of and are contiguous with the protrusion surface 71, and (b) multiple mutually independent plate-shape ribs 3 that protrude from the rear surface 23 of the surface member 2 into the gap 4, and that each extend between the side walls 21 and 22 of the surface member 2 and are aligned in a direction perpendicular to the length of the inner panel 6. This pillar garnish 1 is fixed via engaging holes in the inner panel 6, which are not shown in the drawings, using mounting members.

Each plate-shape rib 3 has a configuration such that its protrusion edge 33 extends essentially along the protrusion surface 71 and the passenger-side side face 72 adjacent and contiguous there to of the panel protrusion 7, and has a deformation inducing means 30 that causes buckling of the rib section 3B, which protrudes toward the protrusion surface 71 of the panel protrusion 7, in the middle part of the protrusion, and to explain in more detail, has a main notch 31 that opens at the position of the protrusion edge 33 of the plate-shape rib 3 at which the edge faces the two-surface contact edge 74 between the protrusion surface 71 and the passenger-side side face 72 on one side of and contiguous to the protrusion surface 71 of the panel protrusion 7, and an auxiliary notch 32 that opens at a position of the protrusion edge 33 at which the edge faces the two-surface contact edge 75 between the protrusion surface 71 and the side surface 73 on the other side of and contiguous to the protrusion surface 71 of the panel protrusion 7.

The synthetic resin used to mold the surface member 2 and plate-shape ribs 3 comprises a thermoplastic resin having superior heat deformability, as well as prescribed additives, and the tan δ as determined through viscoelasticity measurement has a peak height of 0.04 or higher at −40° to 50° C., or preferably at 11° to 32°, or more preferably in the test temperature range defined by the U.S. FMVSS201 standard (19–26°). More preferably, the synthetic resin is adjusted such that its HDT (heat deformation temperature) under a 1.82 MPa stress is 70 to 120°, or preferably 80 to 120° C. A vehicle interior material molded using this resin shows superior impact resistance that satisfies an HIC(d) standard of 1000 or less while maintaining superior heat deformability.

For the base resin used in the above synthetic resin, thermoplastic resins such as polypropylene resins, rubber-enhanced styrene resins, polycarbonate resins, polyamide resins, polyester resins, polyphenylene ether resins or alloy resins comprising combinations thereof are suitable, and the alloy resins are preferably composed of such combinations as polycarbonate and rubber-enhanced styrene resins, polyamide and rubber-enhanced styrene resins, and polyester, polycarbonate, and rubber-enhanced styrene resins.

The polypropylene resins used for the base resin include propylene homopolymers, propylene copolymers with an α-olefin such as ethylene, carboxyl group modified polypropylene, and EPR rubber modified polypropylene. Either block or random copolymerization may be used in this case. It is also acceptable if a filler such as talc or mica is used.

The rubber-enhanced styrene resins used for the base resin comprise a graft copolymer [GP] (20–100% by weight) obtained by graft polymerization of one or more types of rubber polymers [R] (15–90% by weight, preferably 20–80% by weight) selected from among diene rubber polymers, acrylic rubber polymers, olefin rubber polymers, silicone rubber and acrylic-silicone composite rubber, which have an average particle size of 70 to 1000 nm, with a monomer mixture [G] (85–10% by weight, preferably 80–20% by weight) composed of vinyl cyanide (0–40% by weight, preferably 20–35% by weight), aromatic vinyl (10–90% by weight, preferably 20–80% by weight), (meth) acrylic ester (0–90% by weight, preferably 0–75% by weight), and monomers (0–30% by weight) that may be copolymerized with the above (total 100% by weight) (the total of [R] and [G] is 100% by weight), and (ii) a styrene copolymer [FP] obtained by polymerization of vinyl cyanide (0–40% by weight, preferably 20–35% by weight), an aromatic vinyl compound and/or a maleimide monomer (10–90% by weight, preferably 20–75% by weight), (meth) acrylic ester (0–70% by weight, preferably 0–50% by weight) and a monomer that may be copolymerized with the above (0–30% by weight) (total 100% by weight) (the total of [FP] and [GP] is 100% by weight.

To explain the rubber polymers [R] that may be used in the graft polymerization in detail, the diene rubber polymers comprise, for example, polybutadiene, butadiene-styrene copolymer, and butadiene-unsaturated carboxylic alkylester copolymer (butadiene-butyl acrylate copolymer, etc.).

The acrylic rubber polymers may be obtained through polymerization of mixed monomers comprising acrylic alkylester (50–99% by weight), a monomer that may be copolymerized (49.9–0% by weight), and a crosslinking agent (0.1–10% by weight). For the acrylic alkylester, methyl acrylate, ethyl acrylate, propyl acrylate, butyl acrylate, acrylic acid-2-ethylhexyl, or acrylic acid-n-oxyl may be used. Any of these may be used by itself, or in combination with one or more. Monomers that may be copolymerized comprise styrene, α-methyl styrene, methyl methacrylate, ethyl methacrylate, butyl methacrylate, phenylmaleimide or the like. For the crosslinking agent, ethylene glycol dimethacrylate, diethylene glycol dimethacrylate, ethylene glycol diacrylate, diethylene glycol diacrylate, propylene glycol dimethacrylate, divinyl benzene, divinyl adipate, diallyl phthalate, diallyl malate, allyl acrylate, allyl methacrylate, triallyl cyanurate, triallyl isocyanurate or the like. Any of these may be used by itself, or in combination with one or more of the others. The particle size of the bridging acrylic rubber is preferably 70 to 1000 nm.

The olefin rubber may be ethylene-propylene rubber or ethylene-propylene-diene rubber. The silicone rubber may be polydimethyl siloxane, polymethyl phenyl siloxane or the like. The acrylic-silicone composite rubber comprises polybutyl acrylate-dimethyl siloxane composite rubber or the like.

In order to increase the particle size of these diene rubbers or acrylic rubbers, such methods as seed polymerization, acid coagulation dilation, salt coagulation dilation or coagulation dilation adding an acid group-containing latex, etc., may be used, and among these, the method of adding an acid group-containing latex is preferred. An acid group-containing latex [S] may be prepared by polymerization of at least one type of unsaturated acid (5–50% by weight) selected from acrylic acid, methacrylic acid, itaconic acid, or crotonic acid, at least one type of alkyl (meth)acrylate (50–95% by weight) having a carbon number of 1 to 12 in the alkyl group, and a monomer that may be copolymerized with these (0–40% by weight). The alkyl (meth)acrylate in this acid group-containing latex [S] comprises an ester of acrylic acid and alcohol having a straight chain or side chain that has a carbon number of 1 to 12, examples of which include methylacrylate, ethylacrylate, propyl acrylate, butyl acrylate and 2-ethylhexyl acrylate, and in particular, those having a carbon number of 1 to 8 in the alkyl group are preferred. Esters of methacrylic acid and alcohol having a straight chain or side chain that has a carbon number of 1 to 12 may also be used. Examples include methyl methacrylate, ethyl methacrylate, propyl methacrylate, butyl methacrylate and 2-ethylhexyl methacrylate, and in particular, those having a carbon number of 1 to 8 in the alkyl group are preferred. Any of these may be used by itself or in combination with one or more of the others. The monomer to be copolymerized with these may comprise an aromatic vinyl monomer such as styrene, α-methyl styrene or P-methyl styrene, a vinyl cyanide compound such as acrylonitrile or methacrylonitrile, or a monomer that has two or more polymerizing functional groups in the molecule, such as allyl methacrylate, polyethyleneglycol dimethacrylate, triallyl cyanurate, triallyl isocyanurate or diallyl phthalate. Any of these maybe used by itself or in combination with one or more of the others.

To explain the monomer mixture [G] in more detail, for the vinyl cyanide, acrylonitrile or methacrylnitrile may be used, for example.

The aromatic vinyl comprises styrene, α-methyl styrene, P-methyl styrene, chlorostyrene, bromostyrene, vinyl naphtalene or the like.

The (meth)acrylic ester comprises an ester of (meth) acrylic acid and alcohol having a straight chain or side chain that has a carbon number of 1 to 12. Specific examples include methyl (meth)acrylate, ethyl (meth)acrylate, propyl (meth)acrylate, butyl (meth)acrylate, 2-ethylhexyl (meth) acrylate, 2-hydroxylethyl (meth)acrylate, and glycidyl (meth)acrylate. Among these, those having a carbon number of 1 to 8 in the alkyl group are preferred, and in particular, methyl methacrylate is preferred.

The monomer to be copolymerized with these may be a monomer that has two or more polymerizing functional groups in the molecule, such as maleimide, phenylmaleimide, acrylic acid, methacrylic acid, maleic acid anhydride, vinyl acetate, vinyl ether, allyl methacrylate, polyethyleneglycol methacrylate, triallyl cyanurate, triallyl isocyanurate or diallyl phthalate. Any of these may be used by itself or in combination with one or more of the others.

To explain the styrene copolymer [FP] in more detail, for the vinyl cyanide, acrylonitrile or methacrylonitrile may be used. The aromatic vinyl compound may be styrene, α-methyl styrene, P-methyl styrene, chlorostyrene, bromostyrene, vinyl naphthalene or the like. The maleimide monomer may be maleimide, N-methyl maleimide, N-ethyl maleimide, N-propyl maleimide, N-butyl maleimide, N-phenyl maleimide or N- (p-methyl phenyl) maleimid. The (meth) acrylic ester comprises an ester of (meth)acrylic acid and alcohol having a straight chain or side chain that has a carbon number of 1 to 12. Specific examples include methyl (meth)acrylate, ethyl (meth)acrylate, propyl (meth)acrylate, butyl (meth)acrylate, 2-ethylhexyl (meth)acrylate, 2-hydroxylethyl (meth)acrylate, and glycidyl (meth) acrylate. Among these, those having a carbon number of 1 to 8 in the alkyl group are preferred, and in particular, methyl methacrylate is preferred. The monomer to be copolymerized may comprise acrylic acid, methacrylic acid, maleic acid anhydride, vinyl acetate, vinyl ether or the like.

The polycarbonate resin used for the base resin may be selected from among aromatic polycarbonate, aliphatic polycarbonate and aromatic-apolyphatic polycarbonate. In general, it is a polymer or copolymer comprising 2,2-bis (4-oxyphenyl) alkane, bis (4-oxyphenyl) ether, bis (4-oxyphenyl) sulfone, bis (4-oxyphenyl) sulfide, or bis (4-oxyphenyl) sulfoxide bisphenol, and depending on the purpose, a polymer or copolymer using bisphenol substituted with halogen is used. In particular, polycarbonate including bisphenol A is preferred.

The polyester resin used for the base resin may be polyester resins obtained from aromatic dicarbonic acid and alcohol having a hydroxyl value of 2, such as polybutylene terephthalate (PBT), polypropylene terephthalate, polyethylene terephthalate (PET), polypentamethylene terephthalate, polyhexamethylene terephthalate and the like, as well as aromatic polyester obtained from aromatic dicarbonic acid and aromatic diphenol. Among these, polybutylene terephthalate (PBT) and polyethylene terephthalate (PET) are preferred.

The polyamide resin used for the base resin may comprise nylon 6, nylon 6, 6, nylon 6, 10, nylon 6, 12, or nylon 4, 6.

For the additives used in the synthetic resin pertaining to the present invention, a styrene-isoprene-styrene (SIS) block copolymer, a styrene-isoprene (SI) block copolymer, a hydrogen-added styrene-isoprene-styrene (hydrogen-added SIS) block copolymer, a hydrogen-added styrene-isoprene (hydrogen added SI) block copolymer, a styrene-isobutylene-styrene (SIBS) block copolymer, anisoprene-isobutylene copolymer, a cloroprenepolymer, a norbornene polymer, polyurethane, (meth)acrylic ester resin, acrylonitryl-butadiene rubber (NBR) and silicone rubber are preferred, and selection is made from among these considering the selected compatibility with the base resin. The selected additives are added such that the tan δ peak height of the synthetic resin will become 0.04 or higher, with the peak temperature between −40 and 50° C. and the HDT between 70 and 120° C. Where the HDT of the synthetic resin exceeds 120° C., the impact resistance declines accordingly, and it becomes difficult to keep the HIC(d) at 1000 or less.

For the synthetic resin, a thermoplastic resin compound comprising a polypropylene resin to which a styrene-isoprene-styrene (SIS) block copolymer and/or a hydrogen-added styrene-isoprene-styrene (hydrogen-added SIS) block copolymer are added, a thermoplastic resin composition comprising a rubber-enhanced styrene resin to which a styrene-isoprene-styrene(SIS) block copolymer and/or a hydrogen-added styrene-isoprene-styrene (hydrogen-added SIS) block copolymer are added, or a thermoplastic resin composition comprising a rubber-enhanced styrene resin to which a (meth) acrylic ester resin and a styrene-isoprene-styrene (SIS) block copolymer and/or a hydrogen-added styrene-isoprene-styrene (hydrogen-added SIS) block copolymer are added are preferred.

The (meth) acrylic ester resin used as an additive preferably comprises, for example, (meth)acrylic ester (40–90% by weight), a vinyl cyanide compound (10–35% by weight), an aromatic vinyl compound (0–45% by weight), and a monomer (0–30% by weight) that may be copolymerized therewith (total 100% by weight).

In addition, the reduced viscosity (30° C., in N, N-dimethyl formamide solution) of the soluble methylethyl ketone in the (meth) acrylic ester copolymer is preferably 0.3 to 1.2 dl/g. Where the reduced viscosity is less than 0.3 dl/g, the impact resistance declines, and if the reduced viscosity exceeds 1.2 dl/g, the material's ease of molding and the esthetic appeal decline.

The (meth)acrylic ester comprises methyl acrylate, ethyl acrylate, propyl acrylate, butyl acrylate, 2-ethylhexyl acrylate, heptyl acrylate, hexyl acrylate, octyl acrylate, nonyl acrylate, glycidil acrylate, decyl methacrylate, dodecyl methacrylate, oxtadecyl methacrylate, 2-ethylhexyl mathacrylate, 2-hydroxyethyl acrylate or the like. The vinyl cyanide comprises acrylonitrile or methacrylonitrile. The aromatic vinyl comprises styrene, α-methyl styrene, P-methyl styrene, chlorostyrene, bromostyrene, vinyl naphthalene or the like. The monomer that may be copolymerized comprises maleimide, N-methyl maleimide, N-ethyl maleimide, N-propyl maleimide, N-butyl maleimide, N-phenyl maleimide, N-(p-methyl phenyl), acrylic acid, methacrylic acid, maleic acid anhydride, vinyl acetate, vinyl ether, ethylene glycol methacrylate, ethylene glycol acrylate, ethylene glycol dimethacrylate, ethylene glycol diacrylate, diethylene glycol dimethacrylate, diethylene glycol diacrylate, divinyl benzene, divinyl adipate, diallyl phthalate, diallyl maleate, allyl acrylate, allyl methacrylate, triallyl cyanurate, triallyl isocyanurate or the like. Specifically, butyl acrylate-acrylonitrile copolymers, butyl acrylate-acrylonitrile-styrene copolymers, 2-ethylhexyl acrylate-acrylonitrile copolymers, 2-ethyhexyl acrylate-acrylonitrile-styrene copolymers, methyl acrylate-acrylonitrile copolymers, ethyl acrylate-acrylonitrile copolymers or propyl acrylate-acrylonitrile copolymers are preferred.

The styrene-isoprene-styrene (SIS) block copolymer or styrene-isoprene (SI) block copolymer used as an additive comprises an ABA type or AB type copolymer comprising a styrene block and a block comprising a mixture of isoprene and butadiene, and may be (AB)nA or (AB)n. It is also preferred that part or whole of the styrene be α-methyl styrene, 1-vinyl naphthalene, 2-vinyl naphthalene, 3-methyl styrene, 4-propyl styrene or the like.

For the NBR used as an additive, that containing 20% to 60% by weight of acrylonitrile, in particular, is preferred.

The thermoplastic resin compound pertaining to the present invention and comprising a rubber-enhanced styrene resin to which a (meth) acrylic ester resin is added may be manufactured by mixing these base resin and additives in the form of latex, slurry, solution, powder or pellet, or a combination thereof. When collecting polymer powder from the latex of post-polymerization (meth)acrylic ester resin and the latex of styrene copolymer [FP] and/or the graft copolymer [GP] used in the rubber-enhanced styrene resin, a method may be adopted in which, after the latex is solidified by adding the salt of an alkali earth metal, such as calcium chloride, magnesium chloride or magnesium sulfate, the salt of an alkali metal, such as sodium chloride or sodium sulfate, or an inorganic or organic acid such as hydrochloric acid, sulfuric acid, phosphoric acid or acetic acid, it is dehydrated and dried. The spray drying method may also be used.

It is also preferred that public domain heat stabilizers, anti-oxidation agents, UV-absorbing agents, pigments, anti-static agents, lubricants, etc., be further added to the synthetic resin of the present invention.

In particular, where a rubber-enhanced styrene resin is used as the base resin, it is preferred that a phenolic, sulfuric, phosphorous anti-oxidation agent or hindered amine stabilizer, a benzophyenonic or benzotriazolic UV-absorbing agent, internal or external lubricants comprising organopolysiloxane, an aliphatic hydrocarbon, an ester of higher fatty acid and fatty alcohol, an amide or bisamide of higher fatty acid or a modified version thereof, an oligoamide, a metallic salt of higher fatty acid, or the like be added. For the stabilizer, one or a mixture of two or more of these may be used.

The stabilizer(s), lubricant(s) and pigment(s) mentioned above are added to the synthetic resin of the present invention, which is in the form of powder, pellets or other forms, where desired, and they are blended and kneaded using a general melting kneading machine such as a Banbury mixer, a roll mill, single-screw extruder or double-screw extruder.

For the processing method in which a vehicle interior material is molded using a synthetic resin regarding which the tan δ and HDT have been adjusted in the manner described above, a public domain method such as injection molding, extrusion molding, blow molding or vacuum molding maybe used, and in particular, during manufacture of a pillar garnish or door waist, it is preferred that the injection molding method be used.

As described above, in the pillar garnish 1 of the current embodiment that is molded using a synthetic resin regarding which the tan δ peak height is adjusted to be 0.04 or higher, when impact is received from the passenger, part of the kinetic energy of the passenger's head is converted into heat energy (loss energy), such that the energy to be absorbed based on such dynamic energy as the deformation and destruction of the plate-shape ribs 3 may be reduced, and multi-level deformation based on the buckling along the virtual line 8 connecting the bottoms 31a and 32a of the notches of the plate-shape rib 3, and the shift of the virtual line 8 due to the subsequent generation and progress of fissures, are induced. As a result, the pillar garnish 1 of the current embodiment shows efficient impact absorption in which an essentially constant generated acceleration is maintained.

FIG. 3 shows an example of analysis results when it is assumed that no fissures occur. According to this example, it is seen that during vehicle impact, an impact force in the direction indicated by the arrow operates from the surface of the surface member due to the passenger's head, inducing buckling of the rib section 3B along the virtual line connecting the bottom 31a of the main notch 31 and the bottom 32a of the auxiliary notch 32 in the order of (a) through (d), efficiently absorbing the impact.

To explain the construction of each plate-shape rib 3 in more detail, the rib 3 is divided into three rib sections 3A, 3B and 3C that have different thickness distributions in the direction of protrusion, or different average thicknesses, based on the virtual lines 31b and 32b respectively extending from the bottom 31a of the main notch 31 and the bottom 32a of the auxiliary notch 32 to the rear surface 23 of the surface member 2, and the average thickness of the entire rib is set to be within the range of 0.8 to 2.8 mm. By providing steps 31b and 32b at which the panel thickness changes, when the impact is received from the passenger, fissures are guided along the thickness borders indicated by steps, and the impact absorbing characteristic of each plate-shape rib may be more freely adjusted. If the average thickness is smaller than 0.8 mm, the plate-shape rib that has received impact easily collapses down to the surface member before it sufficiently alleviates the impact, and as a result, it becomes difficult to sufficiently absorb and mitigate the impact. If the average thickness if larger than 2.8 mm, the plate-shape rib acquires an excessive buckling strength, and the generated acceleration during impact increases, which makes it difficult to maintain the required impact absorption performance.

Regarding the depth of the main notch 31 and that of the auxiliary notch 32, it is preferred that the main notch 31 that is formed closer to the passenger, and regarding which a higher impact absorbing capability is required, be made deeper than the auxiliary notch 32, as shown in the drawings, and specifically, that the main notch 31 be made equal to approximately ⅓ to ¾ of the protrusion height of the rib at that notch location, and that the auxiliary notch 32 be made equal to approximately ¼ to ⅔ of the protrusion height of the rib at that notch location.

While the configurations of the notches 31 and 32 are not particularly limited, it is preferred that the notch bottoms 31a and 32a be rounded in order to avoid excessive concentration of stress.

In addition, the direction of the depth or the opening angle of the notches 31 or 32 is not particularly limited either, but it is preferred that the notch 31 is formed such that its depth travels in an oblique fashion toward the sidewall 21 to the extent possible.

As described above, the thickness distribution and average thickness of the plate-shape ribs 3, as well as the angle of each notch, etc. may be set to any desired value by appropriately selecting the molding configuration used for the molding process.

A plate-shape rib 3 having multiple auxiliary notches in the protrusion edge is also desirable. For example, FIG. 4(a) shows a plate-shape rib 3 that has, in addition to the above auxiliary notch 32, an auxiliary notch 32B in the rib section 3B that protrudes toward the protrusion surface 71, such that it is located between the auxiliary notch 32 and the main notch 31, and that opens at the protrusion edge 33, and FIG. 4(b) shows a plate-shape rib 3 that has an auxiliary notch 32C that is formed in the rib section C and that opens at the protrusion edge 33. In each rib, buckling is induced along the virtual lines 81 and 81B or 81 and 81C, respectively. It is anticipated in these cases as well that where fissures occur from the main notch 31 or the auxiliary notches 32, 32B or 32C, the ends of each virtual line will shift along the fissures.

The pillar garnish 1 of the second embodiment will now be explained with reference to FIG. 5.

The pillar garnish of this embodiment is molded using synthetic resin regarding which the tan δ peak height is adjusted to be 0.04 or higher, as in the first embodiment, and has the same effect in that it converts part of the kinetic energy of the passenger's head into heat energy, such that the impact force exerted on the ribs protruding into the limited gap surrounded by the vehicle panel and the surface member is reduced.

To refer to the structural features of the plate-shape ribs 3, in the pillar garnish 1 of the current embodiment, as shown in FIG. 5(a), the deformation inducing means 30 includes the main notch 31, a step 36 formed at the position in the protrusion edge 33 at which the edge faces the two-surface contact edge 75 between the protrusion surface 71 and the sidewall 73 continuing on the other side thereof, and a step 36B formed in the rib section 3B and between the step 36 and the main notch 31. When impact is received from the passenger's head, buckling is induced along the virtual line 82 connecting the bottom 31a of the main notch 31 and the bottom 37 of the step 36, as well as along the virtual line 82B connecting the bottom 31a and the bottom 37B of the step 36B. At the same time, these bottoms 37 and 37B may become the starting points for fissures that will travel towards the surface member 2, and it is therefore anticipated that the end of each virtual line will shift along the fissures as in the same way as in the first embodiment described above.

The depth of each step 36 and 36B is made approximately ¼ to ⅔ of the protrusion height of the rib at their respective locations, and shallower than the depth of the main notch 31, as in the case of the auxiliary notch of the first embodiment described above.

The number of steps included in each plate-shape rib 3 may be one, or alternatively, as shown in FIG. 5(b), the inclusion of a step 36C in the rib section C instead of the step 36B is also desirable.

The other aspects of the construction of the rib are basically identical those in the first embodiment. Furthermore, identical structural features are assigned the same numbers and symbols and will not be explained.

The pillar garnish of the third embodiment of the present invention will now be explained with reference to FIG. 6.

The pillar garnish 1 of this embodiment is molded using synthetic resin regarding which the tan δ peak height is adjusted to be 0.04 or higher, as in the first embodiment, and has the same effect in that it converts part of the kinetic energy of the passenger's head into heat energy, such that the impact force exerted on the ribs protruding into the limited gap surrounded by the vehicle panel and the surface member is reduced.

Referring to the structural features of the plate-shape ribs 3, in the pillar garnish of the current embodiment, as shown in FIG. 6(a), the deformation inducing means 30 includes the main notch 31, and a thin area 35 located at the position of the protrusion edge 33 at which the edge faces the two-surface contact edge between the protrusion surface 71 and the sidewall 72 continuing on the other side thereof. When impact is received from the passenger's head, fissures occur in the thin area 35 such that buckling is induced along the virtual line 83 connecting the bottom 31a of the main notch 31 and the bottom 35a of the thin area 35. At the same time, these bottoms 31a and 35a may become the starting points for fissures that will travel toward the surface member 2, and it is therefor anticipated that the end of each virtual line will shift along the fissures as in the same way as in the first embodiment described above.

As shown in FIG. 6(b), it is also preferred that multiple thin areas be included, or alternatively, that a main thin area 34 having essentially the same cross-sectional configuration as the main notch 31 be included in place of the main notch 31. In these cases, fissures occur in the main thin area 34 and the other thin areas 35 and 35B due to the impact from the passenger's head, and buckling is induced along the virtual lines 83 and 83B.

The other aspects of the construction of the rib are basically identical to those in the first embodiment. Furthermore, identical structural features are assigned the same numbers and symbols and will not be explained.

The fourth embodiment of the present invention will now be explained with reference to FIG. 7.

While the pillar garnish 1 pertaining to the first through third embodiments described above is a front pillar garnish fixed to the front pillar of an automobile, this embodiment relates to a pillar garnish fixed to the center pillar.

The pillar garnish 1 pertaining to this embodiment is a center pillar garnish that is fixed to the center pillar of an automobile, and in each plate-shape rib 3, the protrusion edge 33 extends along the protrusion surface 71 of the panel protrusion 7 and the passenger sidewalls 76 and 77 continuing on either side thereof (vehicle front and rear directions), and includes a deformation inducing means 30 that causes the rib section 3B, which protrudes toward the protrusion surface 71 of the panel protrusion 7, to buckle in the middle part of the protrusion when impact is received from the passenger in the front seat or the back seat.

Each plate-shape rib 3 includes, as components of the deformation inducing means 30, two main notches 31 and 31 that open at the positions at which the protrusion edge faces the two-side contact edge 78 and 79 between the protrusion surface 71 of the panel protrusion 7 and the passenger sidewalls 76 and 77 continuing on either side thereof, respectively.

Because the synthetic resin used to mold the rib, variations such as auxiliary notches, steps or thin areas, and other aspects of the rib construction are basically identical to those in the first through third embodiments, identical structural features are assigned the same numbers and symbols and will not be explained.

The fifth embodiment of the present invention will now be explained with reference to FIG. 8.

Instead of being molded as an integral unit of mutually independent multiple plate-shape ribs 3 and a surface member 2 that are molded through injection molding, the pillar garnish 1 pertaining to this embodiment comprises separately formed plate-shape ribs 3 and a surface member 2, which are assembled together when they are mounted to the vehicle panel. For the bonding means used for the assembly, clips, thermal caulking, an adhesive agent, two-sided adhesive tape, etc. may be used.

Each plate-shape rib 3 is bound to the others by one or more vertical ribs 31 that extend along the length of the vehicle panel, and these multiple plate-shape ribs 3 and vertical ribs 31 are integrally molded through injection molding. For the lattice structure 35 comprising these multiple plate-shape ribs 3 and vertical ribs 31, the construction shown in FIG. 8(a), in which two vertical ribs 31 and 32 respectively extend along the outer edges of the notches 31 and 32 of each plate-shape rib 3 on the surface side, or the construction shown in FIG. 8(b), in which vertical ribs 33 and 34 that are in contact with the sidewalls 21 and 22 of the surface member 2 are also included, such that the areas of contact between the ribs and the sidewalls 21 and 22 increase and the mutual bonding strength may be increased, may be used. The thickness of each vertical rib 31 is preferably set to between 0.8 and 2.8 mm, as in the case of the plate-shape ribs 3 (transverse ribs).

Where the surface member 2 and the plate-shape ribs 3 are separately molded, each component may be molded using the optimal synthetic resin. For example, a hydrogen-added styrene-isoprene-styrene (hydrogen-added SIS) block copolymer or a hydrogen-added styrene-isoprene (hydrogen-added SI) block copolymer, which are superior in terms of light resistance and decorability, may be used for the surface member 2, and a thermoplastic resin that has better impact resistance may be used for the lattice structure 35.

The impact absorbing member for vehicle interior of the present invention may be suitably used as a roof side rail garnish or a door waist, in addition to as a pillar garnish of an automobile, such as a front pillar garnish or a center pillar garnish. Examples The present invention will be specifically explained below with reference to examples, but these examples do not limit the present invention whatsoever.

First, the abbreviations for the raw materials used in the examples and the comparison examples are shown below.

St: Styrene
αMSt: α-methylstyrene
AN: Acrylonitrile
PMI: Phenyl maleimide
MMA: Methyl methacrylate
BA: Butyl acrylate
MAA: Methacrylic acid
tDM: Tert-dodecyl mercaptan
CHP: Cumene hydroxyperoxide <Synthesis of rubber-enhanced styrene resin [A]>

(A) Synthesis of Graft Copolymers [GP1], [GP2] and [GP3]

The substances shown in the following Table 2 were placed in are action container equipped with a stirrer and a reflux in a nitrogen atmosphere.

TABLE 2

| Substance | Parts by weight |
| --- | --- |
| Water | 250 |
| Sodium formaldehyde sulfoxylate | 0.2 |
| Ferrous sulfate | 0.001 |
| Ethylene diamine tetraacetic acid disodium | 0.005 |
| Sodium dodecyl benzene sulfonate | 2.0 |
| Rubber (solid component) | 50 |

The temperature of the reaction container was increased to 60° C. in a nitrogen atmosphere while the contents were stirred. When 60° C. was reached, the mixture having the composition shown in Table 3 was dripped for four hours. After dripping was completed, stirring was further continued for one hour at 60° C., whereupon polymerization was completed and graft copolymers [GP1] through [GP3] were obtained.

TABLE 3

| Graft co-polymer | Rubber type | Composition (parts by weight) | | | | Graft rate (% by weight) |
| --- | --- | --- | --- | --- | --- | --- |
| | | St | AN | MMA | CHP | |
| GP1 | Polybutadiene | 37.5 | 12.5 | — | 0.2 | 50 |
| GP2 | Polybutadiene | 15.0 | — | 35.0 | 0.2 | 53 |
| GP3 | Polybutyl acrylate | 37.5 | 12.5 | — | 0.2 | 48 |

The polybutadiene used was made by enlarging latex particles having an average particle size of 0.1 μm and a 90% by weight gel content with an acid group-containing latex, such that the average particle size would become 0.45 μm.

The acrylic rubber polymer used was a copolymer of 99% by weight of butyl acrylate and 1% by weight of allyl acrylate, in which latex particles having an average particle size of 0.1 μm were enlarged with an acid group-containing latex, such that the average particle size would become 0.4 μm.

(B) Synthesis of Styrene Copolymers [FP1] through [FP4]

The substances shown in the following Table 4 were placed in a reaction container equipped with a stirrer and a reflux in a nitrogen atmosphere.

TABLE 4

| Substance | Parts by weight |
| --- | --- |
| Water | 250 |
| Sodium formaldehyde sulfoxylate | 0.5 |
| Ferrous sulfate | 0.003 |
| Ethylene diamine tetraacetic acid disodium | 0.01 |
| Sodium dodecyl benzene sulfonate | 2.0 |

The temperature of the reaction container was increased to 60° C. in a nitrogen atmosphere while the contents were stirred. When 60° C. was reached, the mixture having the composition shown in Table 5 was dripped for six hours. After the dripping was completed, stirring was further continued for one hour at 60° C., whereupon polymerization was completed and styrene copolymers [FP1] through [FP4] were obtained.

TABLE 5

| Styrene copolymer | Composition (parts by weight) | | | | | | |
| --- | --- | --- | --- | --- | --- | --- | --- |
| | αMST | St | AN | PMI | MAA | tDM | CHP |
| FP1 | 65 | 10 | 25 | — | — | 0.5 | 0.3 |
| FP2 | — | 75 | 25 | — | — | 0.45 | 0.3 |
| FP3 | — | 55 | 20 | 25 | — | 0.4 | 0.3 |
| FP4 | 65 | 7 | 25 | — | 3 | 0.5 | 0.3 |

(C) Synthesis of Acrylic Ester Resins

The substances shown in the following Table 6 were placed in a reaction container equipped with a stirrer and a reflux in a nitrogen atmosphere.

TABLE 6

| Substance | Parts by weight |
| --- | --- |
| Water | 250 |
| Sodium formaldehyde sulfoxylate | 0.5 |
| Ferrous sulfate | 0.003 |

TABLE 6-continued

| Substance | Parts by weight |
|---|---|
| Ethylene diamine tetraacetic acid disodium | 0.01 |
| Sodium dodecyl benzene sulfonate | 20 |

The temperature of the reaction can was increased to 60° C. in a nitrogen atmosphere while the contents were stirred. When 60° C. was reached, the mixture having the composition shown in Table 7 was dripped for six hours. After the dripping was completed, stirring was further continued for one hour at 60° C., whereupon polymerization was completed and acrylic ester resins [RP1] and [RP2] were obtained.

TABLE 7

| Acrylic ester resin | Composition (parts by weight) | | | | |
|---|---|---|---|---|---|
| | BA | St | AN | tDM | CHP |
| RP1 | 75 | — | 25 | 0.3 | 0.3 |
| RP2 | 70 | 5 | 25 | 0.3 | 0.3 |

(D) Preparation of Resins Containing a Rubber-enhanced Styrene Resin and an Acrylic Ester Resin (Latex Blends) [A1] through [A7]

The latexes of graft copolymers [GP1] through [GP3], styrene copolymers [FP1] through [FP4] and acrylic ester resins [RP1] and [RP2] obtained in the processes (A), (B) and (C) described above were uniformly mixed using the compositions shown in Table 8. A phenolic anti-oxidation agent was added to the mixture, which was then coagulated in a calcium chloride solution and thermally coagulated. The mixture was then washed in water, dehydrated and dried, whereupon powder rubber-enhanced styrene resins [A1] through [A7] were obtained.

TABLE 8

| Rubber-enhanced styrene resin | Composition (parts by weight) | | | | | | | | |
|---|---|---|---|---|---|---|---|---|---|
| | GP1 | GP2 | GP3 | FP1 | FP2 | FP3 | FP4 | RP1 | RP2 |
| A1 | 60 | | | 40 | | | | 17 | |
| A2 | 60 | | | | 40 | | | 17 | |
| A3 | | 60 | | | | 40 | | 17 | |
| A4 | | 60 | | | | 40 | | | 27 |
| A5 | | | 60 | | 40 | | | 17 | |
| A6 | 60 | | | | | 40 | | | |
| A7 | | 60 | | | | | 40 | | |

<Molding of examples 1 through 12 and comparison examples 1 and 2>

The resins manufactured in the above process (D), PP, PC, PA, PBT and additives were mixed as shown in Table 9. 0.5 parts by weight of AO-20 (anti-oxidation agent manufactured by Asahi Denka Co., Ltd.), 0.5 parts by weight of PEP-24G (anti-oxidation agent manufactured by Asahi Denka Co., Ltd.), 3parts by weight of titanium white (CR-60, manufactured by Ishihara Sangyo Co., Ltd.) and 0.03 parts by weight of carbon black (carbon black #30, manufactured by Mitsubishi Kagaku Co., Ltd.) were also added to the mixture, which was then blended using a super mixer and made into pellets using a 40 m/m extruder. From these pellets, test samples (100 mm×150 mm×2 mm flat plates) and test samples needed for property testing were molded using a 150 TON injection molding machine at a 100 rpm screw rotation and a 260° C. nozzle temperature. In addition, in order to measure the HIC(d), a pillar garnish having the configuration shown in FIG. 17 was molded using a 360 TON injection molding machine at a 90 rpm screw rotation and a 260° C. nozzle temperature.

TABLE 9

| | Composition (parts by weight) | | | | | | | | | | | | | | |
|---|---|---|---|---|---|---|---|---|---|---|---|---|---|---|---|
| | Base resin | | | | | | | | | | | Additive | | | |
| | A1 | A2 | A3 | A4 | A5 | A6 | A7 | PP | PC | PA | PBT | SIS | Hydrogen-added SIS | Norbornene rubber | NBR |
| Example 1 | 117 | | | | | | | | | | | 10 | | | |
| Example 2 | | 117 | | | | | | | | | | | 10 | | |
| Example 3 | | | 117 | | | | | | | | | 10 | | | |
| Example 4 | | | | 127 | | | | | | | | | | | |
| Example 5 | | | | | 117 | | | | | | | 10 | | | |
| Example 6 | | | | | | 100 | | | | | | 15 | | | |
| Example 7 | | | | | | | 50 | | 50 | | | 10 | | | |
| Example 8 | | | | | | 70 | | 30 | | | | 15 | | | |
| Example 9 | | | | | | 70 | | 20 | | 10 | | 15 | | | |
| Example 10 | | | 117 | | | | | | | | | | | 5 | |
| Example 11 | | | 117 | | | | | | | | | | | | 10 |
| Example 12 | | | | | | | | 100 | | | | 10 | | | |
| Comparison example 1 | | | | | | 100 | | | | | | | | | |
| Comparison example 2 | | | | | | | | 100 | | | | | | | |

<Measurement>
(E) Measurement of Viscoelasticity Spectrum (tan δ)
Rectangular 5 mm ×50 mm ×2 mm pieces were prepared from the 100 mm ×150 mm ×2 mm flat panel test samples, and the tan δ at a 100 Hz frequency in the bending mode was measured in the range of −60° C. to 100° C. using a DMS110 manufactured by Seiko Denshi Co., Ltd., to obtain the peak temperature and tan δ.

(F) Heat Deformation Property (HDT)

The heat deformation property was evaluated in terms of heat deformation temperature under a 18.6 kg/cm²load in accordance with the ASTMD648 standard [unit of measurement: ° C.].

(G) Head Injury Characteristics (HIC(d))

Figure 17:
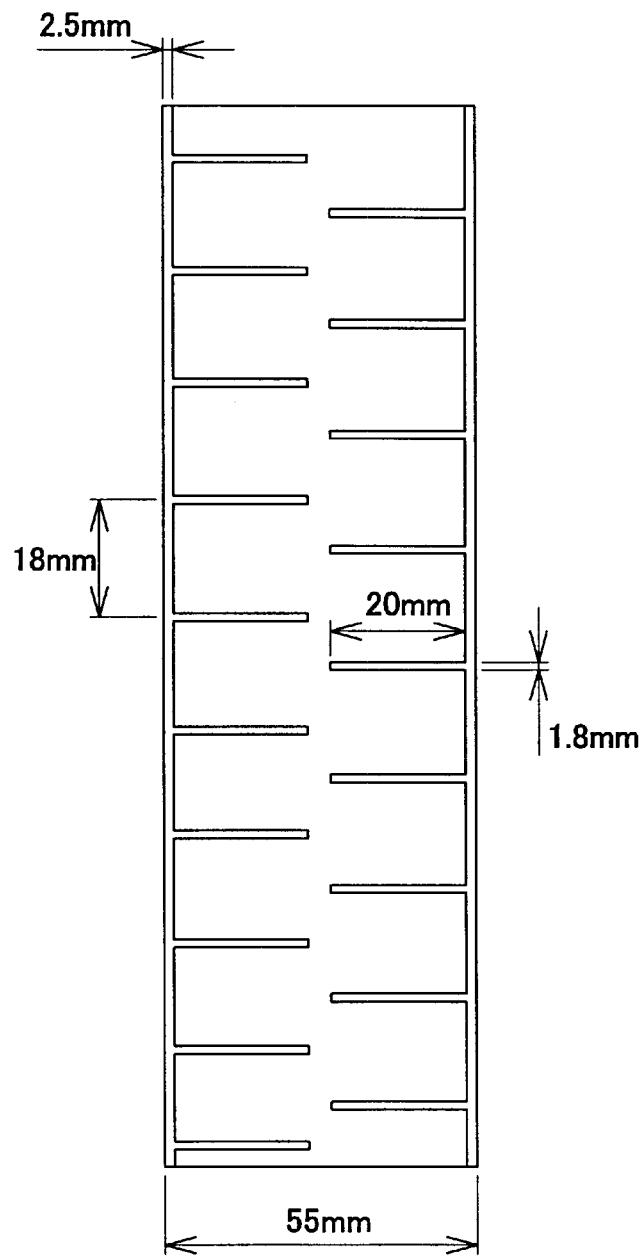
FIGS. 17(a) and 17(b) show a pillar garnish molded to measure the HIC (d) in the examples 1 through 12 and the comparison examples 1 and 2.
Figure 17:
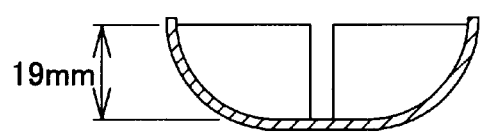

An aluminum half-sphere with a weight of 4.6 kg and 165 mm in diameter was deemed a dummy head pursuant to the U.S. FMVSS standard, and was dropped by gravity onto a pillar garnish having the configuration shown in FIG. 17, so that it would collide with the garnish at a velocity of 6.67 m/s. A polyurethane sheet having a hardness of 60 and a thickness of 13 mm, and which was deemed the skin of the dummy head, was applied to the surface of the aluminum ball. The acceleration in three directions was measured using a three-axis acceleration sensor placed at the center of gravity of the aluminum ball. After noise frequencies equal to or larger than 1650 Hz were eliminated, the sum of vector (three-axis acceleration) sum-time change was plotted on a graph, and based on this graph and using an equation included in the U.S. FMVSS201 standard, the HIC(d) at 23° C. was sought. According to the standard, in order to meet the safety standard, the HIC(d) value must be 1000 or less. The results are shown in Table 10.

TABLE 10

| | Measurement results | | |
|---|---|---|---|
| | tanδ (peak temperature) | HDT (° C.) | HIC (d) |
| Example 1 | 0.08 (30° C.) | 82 | 970 |
| Example 2 | 0.07 (12° C.) | 78 | 910 |
| Example 3 | 0.07 (29° C.) | 83 | 900 |
| Example 4 | 0.08 (28° C.) | 84 | 920 |
| Example 5 | 0.06 (28° C.) | 78 | 920 |
| Example 6 | 0.07 (32° C.) | 83 | 910 |
| Example 7 | 0.07 (31° C.) | 92 | 960 |
| Example 8 | 0.07 (30° C.) | 105 | 950 |
| Example 9 | 0.07 (29° C.) | 103 | 970 |
| Example 10 | 0.05 (48° C.) | 87 | 890 |
| Example 11 | 0.08 (16° C.) | 81 | 900 |
| Example 12 | 0.07 (19° C.) | 72 | 920 |
| Comparison example 1 | NA | 88 | 1400 |
| Comparison example 2 | NA | 86 | 1250 |

PP: Polypropylene manufactured by Nippon Polychem Co., Ltd. @ Novatech

PC: Bisphenol A polycarbonate, degree of polymerization 2200

PA: Polyamide 6, molecular weight 17500

PBT: Polybutylene terephthalate, molecular weight 27000

SIS: Styrene-isoprene-styrene block, HYBRAR @5127, manufactured by Kureha Co., Ltd.

Hydrogen-added SIS: Hydrogen-added styrene-isoprene-styrene block, HYBRAR @7125, manufactured by Kureha Co., Ltd.

Norbornene rubber: Manufactured by CdF Co., Ltd.

NBR: Butadiene-nitrile rubber (contains 35% by weight of AN)

The impact text conducted on the front pillar garnish of the examples 13 through 18 and the comparison examples 3 through 5 shown below will be explained.

Construction of Examples and Comparison Examples

The construction of each example is described below.

Figure 9:
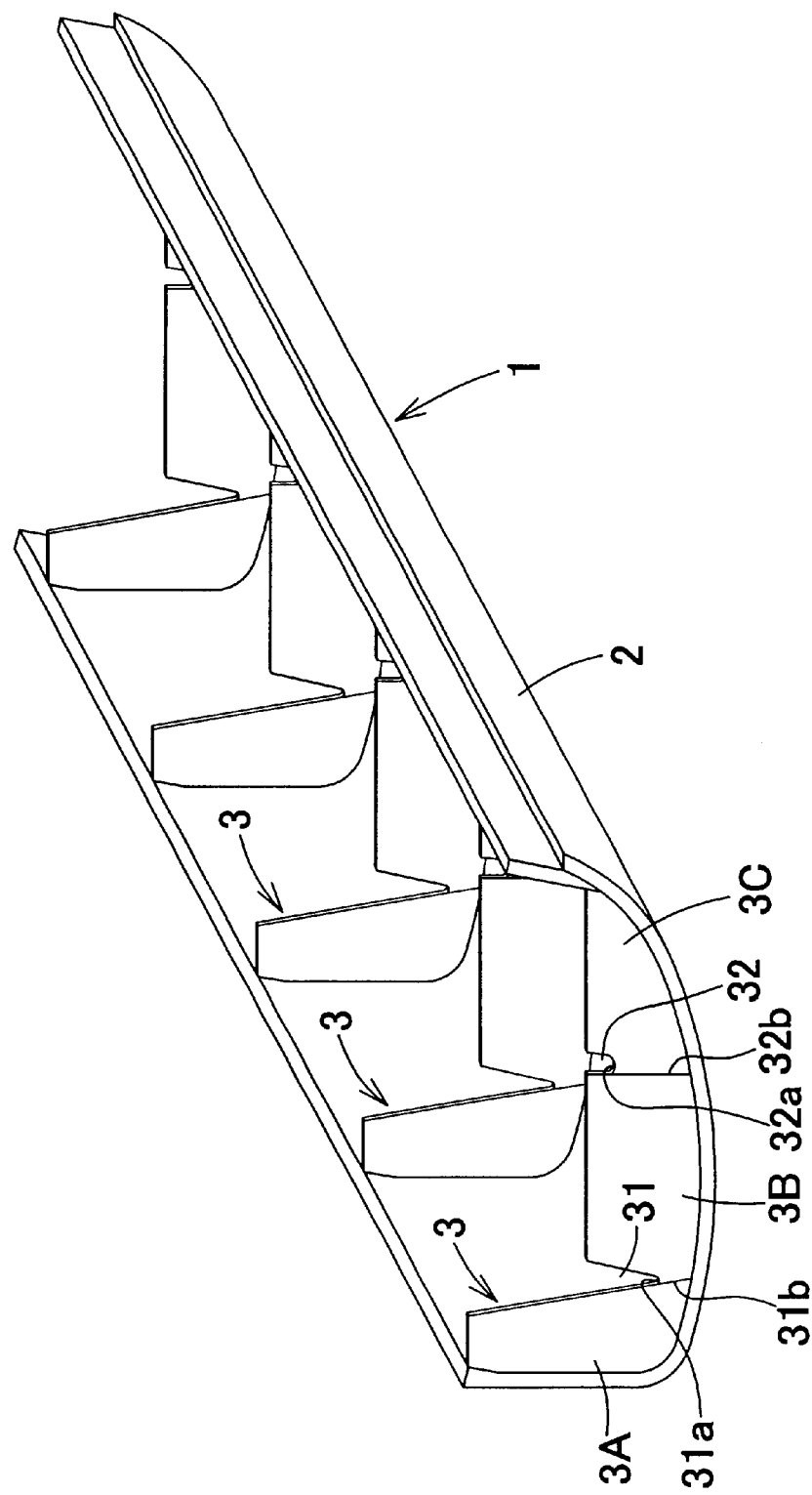
FIG. 9 is a perspective view showing the construction of the front pillar garnish of the examples 13 and 14 and a comparison example 3.

The examples 13 and 14 and the comparison example 3 each comprise the front pillar garnish 1 shown in FIG. 9. The details of the construction are the same as in the first embodiment described above. Specifically, the rib sections 3A, 3B and 3C, which are distinguished from each other via virtual lines 31b and 32b extending from the bottom 31a of the main notch 31 and the bottom 32a of the auxiliary notch 32 toward the surface member 2, respectively, are given an average thickness of 1. 8 mm, 1. 8 mm and 1. 2 mm, respectively, and the thickness distribution in the directions of protrusion of the rib section 3A and the rib section 3B are different from each other.

Figure 12:
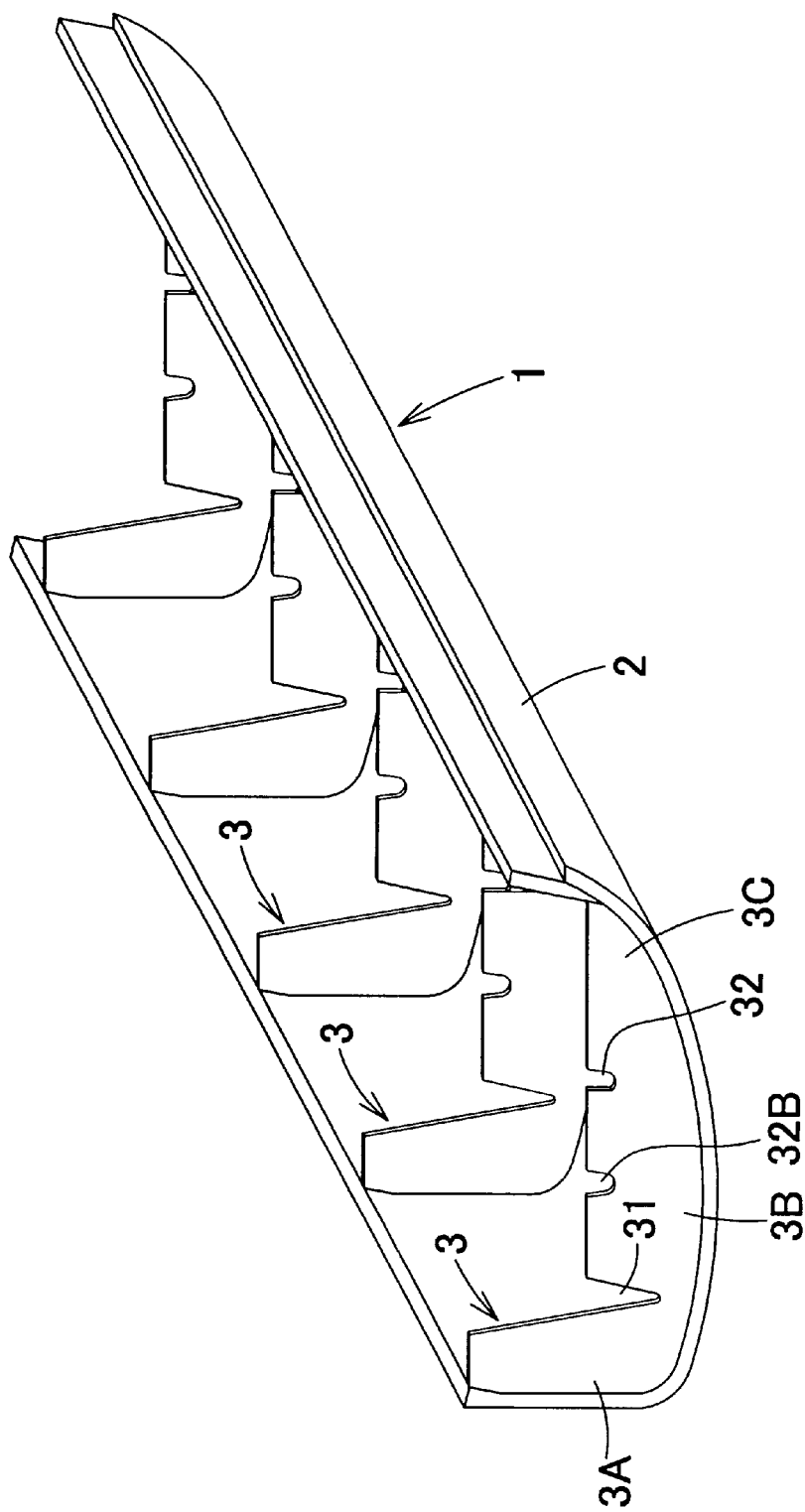
FIG. 12 is a perspective view showing the construction of the front pillar garnish of the examples 15 and 16.

The examples 15 and 16 each involve the front pillar garnish 1 shown in FIG. 12. The details of the construction are the same as in the first embodiment described above. Specifically, each plate-shape rib 3 has, in addition to an auxiliary notch 32, another auxiliary notch 32B that opens up in the rib section 3B and is located between the auxiliary notch 32 and the main notch 31, and the rib sections 3A, 3B and 3C are essentially uniform in thickness with an average thickness of 1.8 mm.

Figure 13:
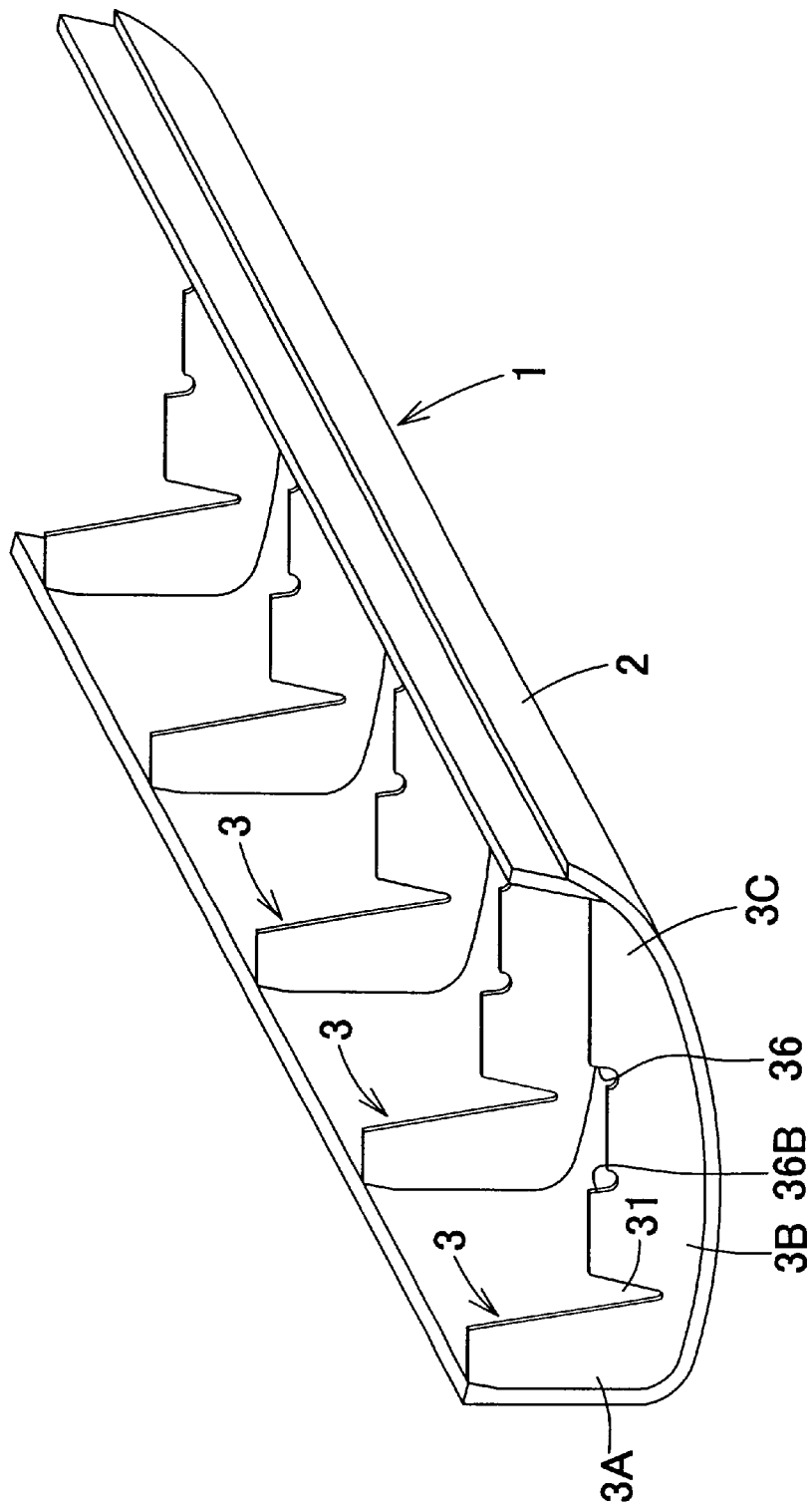
FIG. 13 is a perspective view showing the construction of the front pillar garnish of the examples 17 and 18.

The examples 17 and 18 each involve the front pillar garnish 1 shown in FIG. 13. The details of the construction are the same as in the second embodiment described above. Specifically, each plate-shape rib 3 has a main notch 31, a step 36 and a step 36B, and the rib sections 3A, 3B and 3C are essentially uniform in thickness with an average thickness of 1.8 mm.

Figure 14:
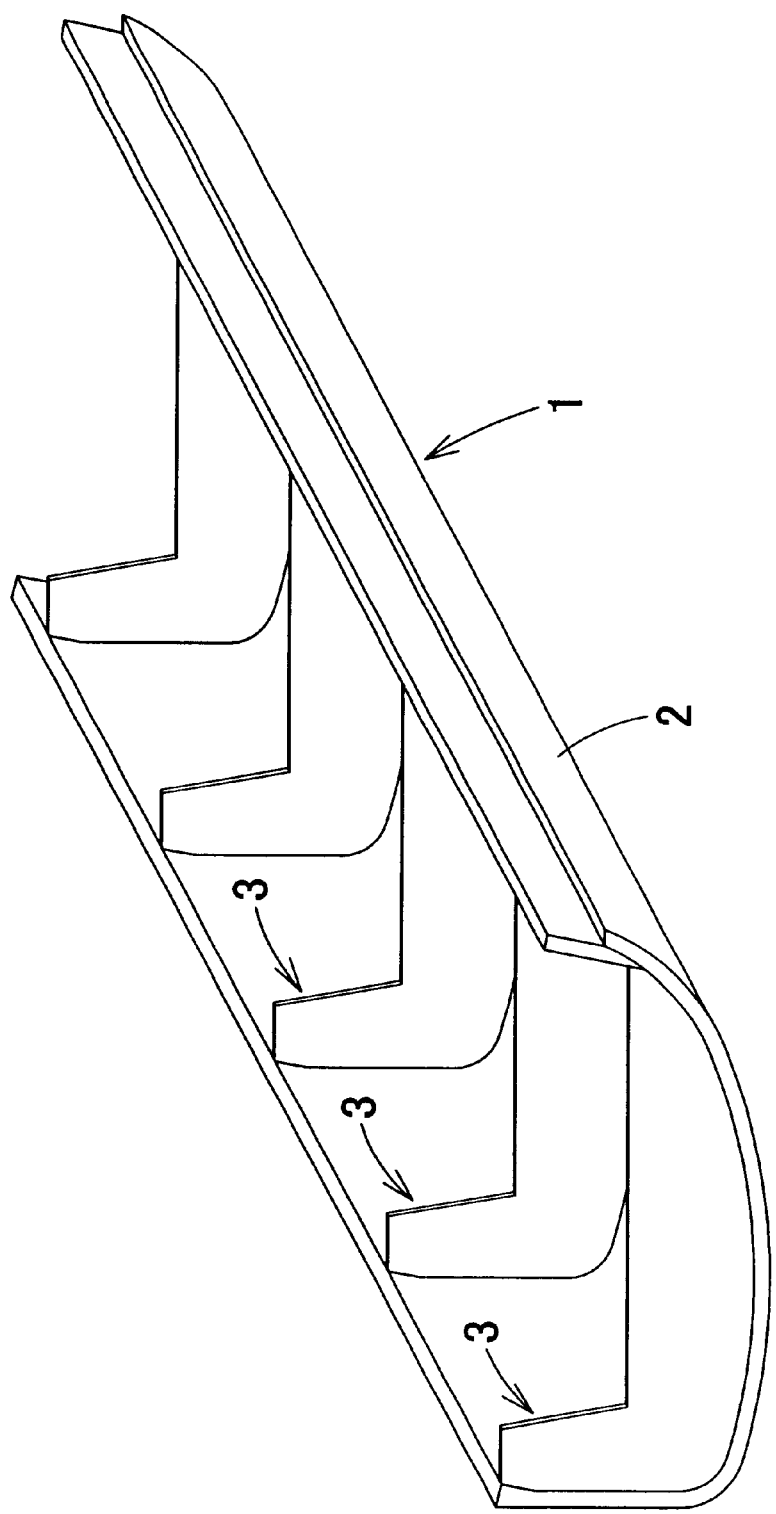
FIG. 14 is a perspective view showing the construction of the front pillar garnish of the comparison examples 4 and 5.
Figure 15:
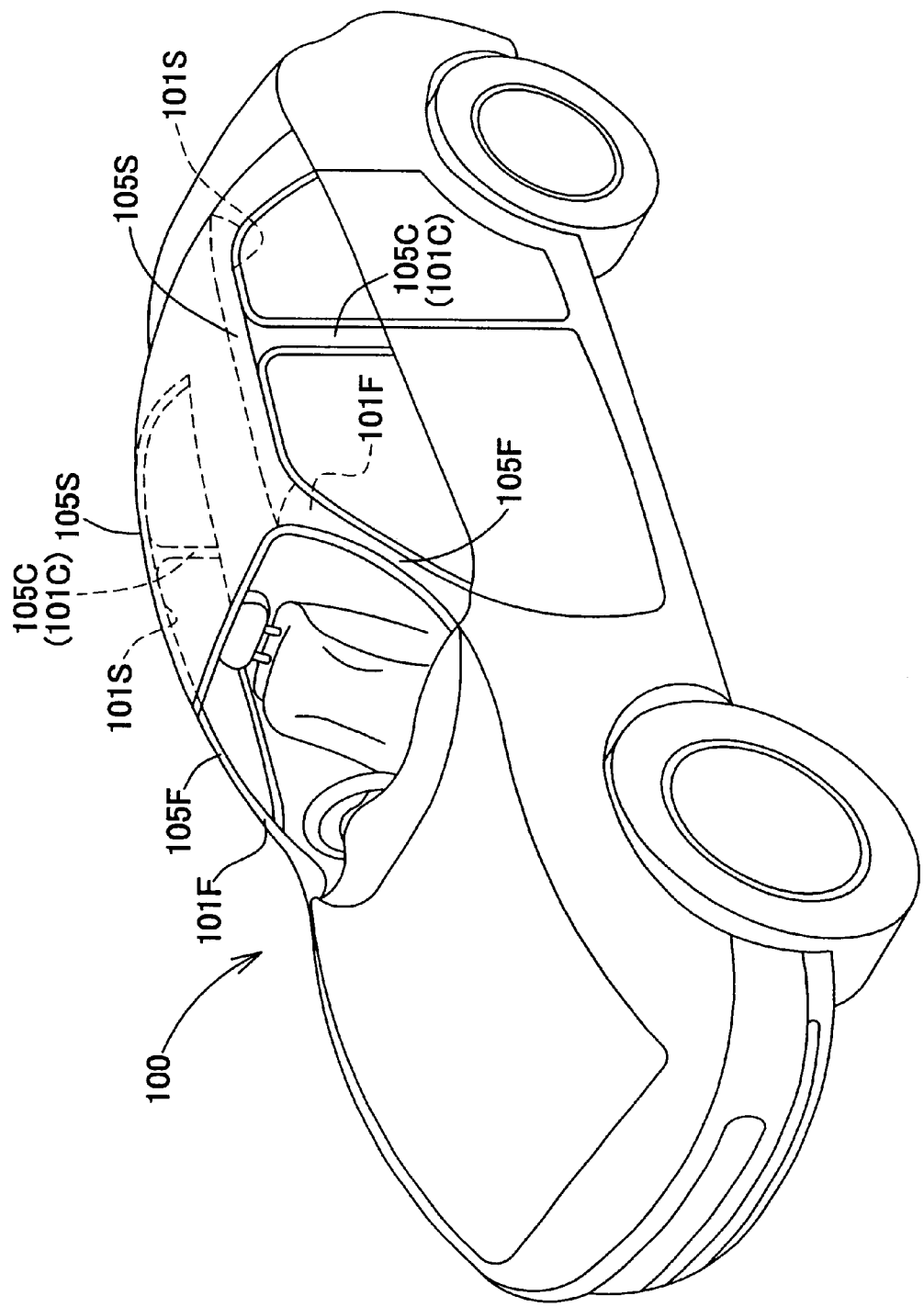
FIG. 15 is a drawing to explain the vehicle interior material which may be mounted to various parts of an automobile.
Figure 16:
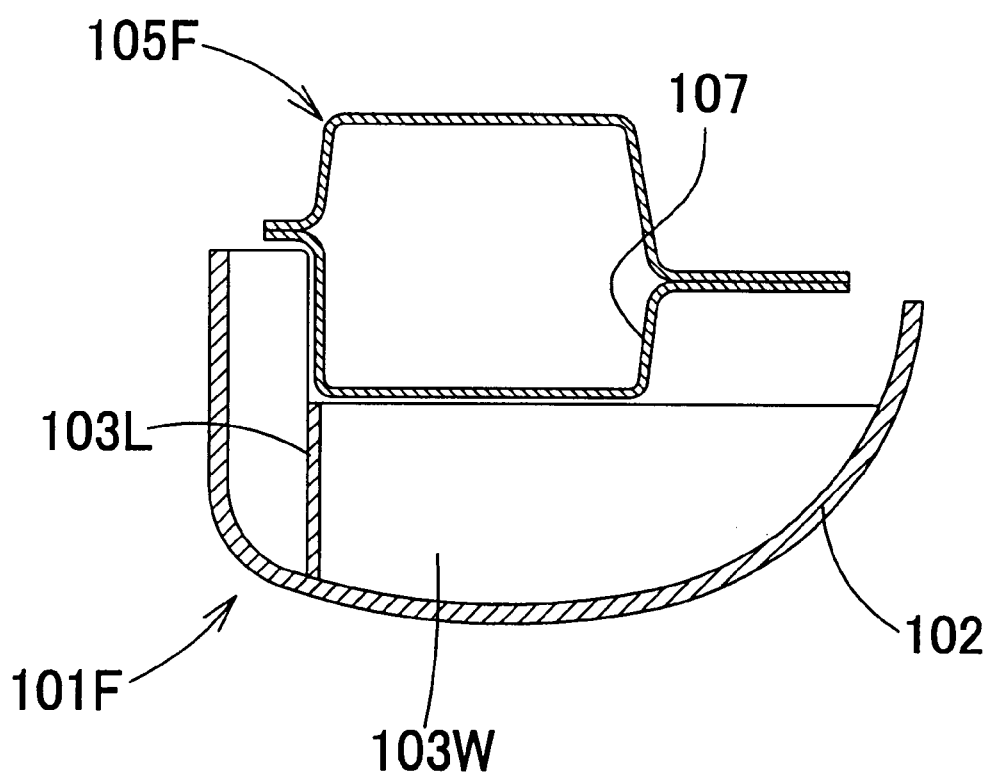
FIG. 16 is a cross-sectional view of the front pillar garnish comprising a conventional vehicle interior material mounted to a vehicle panel.

The comparison examples 4 and 5 each involve the front pillar garnish 1 shown in FIG. 14. Each plate-shape rib 3 has no deformation inducing means such as notches. The thickness of each plate-shape rib 3 is essentially uniform, with an average thickness of 1.8 mm.

The maximum protrusion height of the plate-shape rib 3 in each example was equally set at approximately 17 mm.

Synthetic Resin in Examples and Comparison Examples

The synthetic resin used to mold each example is explained below.

The examples 13, 15 and 17 and the comparison example 4 were molded using synthetic resin comprising (i) an ABS resin (base resin) comprising (a) a 60% by weight of a graft copolymer, which comprises 50% by weight of polybutadiene rubber, 25% by weight of styrene, 25% by weight of methyl methacrylate, and 0.2% by weight of cumene hydroxyperoxide, and (b) 40% by weight of a styrene copolymer, which comprises 55% by weight of styrene, 20% by weight of acrylonitrile, 25% by weight of phenyl maleimide, 0.4% by weight of tert-dodecyl mercaptan, and 0.3% by weight of cumene hydroxyperoxide, to which (ii) 17% by weight of an acrylic ester resin (additive) comprising (a) 75% by weight of butyl acrylate, 25% by weight of acrylonitryl, 0.3% by weight of tert-dodecyl mercaptan, and 0.3% by weight of cumene hydroxyperoxide was added, such that the tan δ of the synthetic resin was adjusted to be 0.04 (peak temperature 23° C.).

The examples 14, 16 and 18 and the comparison example 5 were molded using synthetic resin comprising the synthetic resin used for the examples 13, 15 and 17 and the comparison example 4, to which 10% by weight of a styrene-isoprene-styrene (SIS) block copolymer was further added, such that that the tan δ of the synthetic resin was adjusted to be 0.065 (peak temperature 23° C.)

The comparison 3 was molded using the ABS resin (base resin) described above without the use of any additives, and the tan δ of the base resin was 0.03 (peak temperature 23° C.).

Impact Test

In the impact test, a drop impact test machine owned by the applicant was used. The pillar garnish of each example was reversed, and in order to reproduce the absorption by the skin of the dummy head, a thickness of 12 mm chloroprene rubber sheet with a HaA 48 was set on the surface of the surface member 2 close to the passenger position, and an aluminum ball weight having a 4.6 kg mass, 165 mm in diameter and a spherical impact surface was caused to collide with the garnish at a collision velocity of 6.67 m/s at a room temperature of 23° C. A three-axis acceleration sensor was placed at the center of gravity of the weight. The three-axis synthesized acceleration (the sum of vector) was calculated from each axial waveform and plotted in a graph, in which the vertical axis represented the generated acceleration and the horizontal axis represented the time, after the elimination of frequency (or number of vibration) of 1650 Hz or larger, and the HIC(d) was calculated based on the computation equations set forth in FMVSS201.

Figure 10:
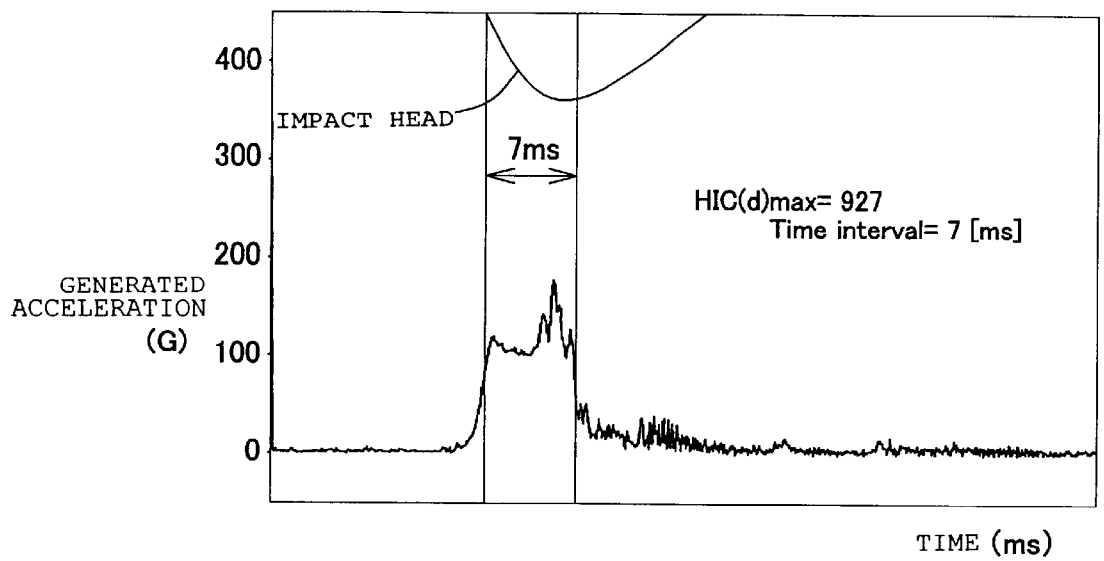
FIG. 10 is a graph showing the results of an impact test conducted on the front pillar garnish of the example 13, in which the vertical axis represents the generated acceleration (in G) and the horizontal axis represents the time (in ms)
Figure 11:
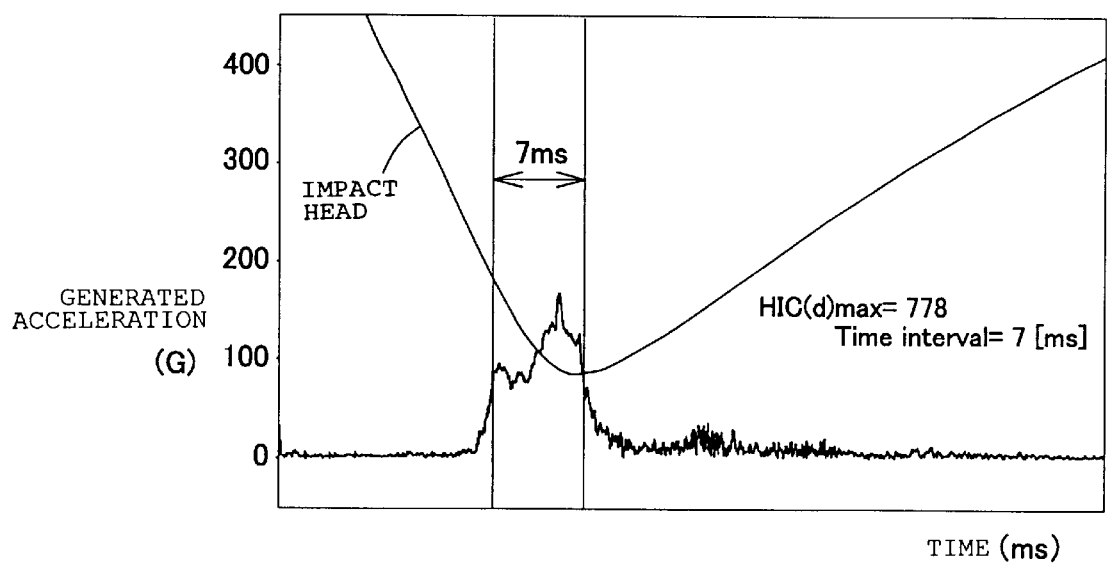
FIG. 11 is a graph showing the results of an impact test conducted on the front pillar garnish of the example 14, in which the vertical axis represents the generated acceleration (in G) and the horizontal axis represents the time (in ms).

Table 11 shows the calculation results of HIC(d) in each example. FIGS. 10 and 11 are graphs showing the wave of generated acceleration and the HIC(d) of the examples 13 and 14, respectively.

TABLE 11

| | | Tanδ peak height | | |
|---|---|---|---|---|
| | | 0.04 | 0.065 | 0.03 |
| Reference drawing showing construction | FIG. 9 | Example 13 927 | Example 14 778 | Comparison example 3 1077 |
| | FIG. 12 | Example 15 946 | Example 16 790 | |
| | FIG. 13 | Example 17 983 | Example 18 821 | |
| | FIG. 14 | Comparison example 4 1372 | Comparison example 5 1150 | |

Discussion

According to Table 11, the examples 13 and 14 which had the construction shown in FIG. 9 and regarding which the synthetic resin had a tan δ peak height of 0.04 or higher showed good impact absorption with a low HIC(d) value. The examples 15 and 16, which had multiple auxiliary notches 32 and 32B, experienced a 1.5 to 2% increase in the HIC(d) value, and the examples 17 and 18, which had the steps 36 and 36B, experienced a 5 to 6% increase in the HIC(d) value. While the increase in the HIC(d) value was 6% or less in all of these examples, the comparison examples 4 and 5, which did not have any deformation inducing means, saw a large increase in the HIC(d) value, i.e., an approximately 48% increase.

It is seen that the effect of increasing the tan δ peak height of the synthetic resin from 0.04 to 0.065 translates into an approximately 16% reduction of the HIC(d) value.

With the comparison example 3, which had the construction shown in FIG. 9 and regarding which the synthetic resin had a tan δ peak height of 0.03, the HIC(d) value increased by approximately 16% in comparison with the example 13 having a tan δ peak height of 0.04.

It is seen from the graph of FIG. 10 that the rate of increase in the generated acceleration reduces within 2 ms of the onset of impact, and that the impact is efficiently absorbed while a generated acceleration of 150 G or less is maintained thereafter, indicating that multi-stage destruction is occurring in each rib.

It is seen from the graph of FIG. 11 that because part of the impact energy was converted into heat energy, the generated acceleration up to 4 ms is maintained at under 70 G, and the HIC(d) calculated from this waveform also decreases from 927 to 778, indicating that the rib height may be reduced.

In the impact absorbing member for vehicle interior described above, the tan δ peak height of the synthetic resin used for molding is 0.04 or higher, and therefore, when the impact due to passenger collision is absorbed, a large part of the impact is absorbed not only based on dynamic energy as represented by the deformation and destruction of the ribs, but also as heat energy, and as a result, the rib height may be reduced to approximately 17 mm or less.

In addition, because each plate-shape rib has a deformation inducing means comprising notches, steps and/or thin areas, multi-stage deformation and destruction occur, in which buckling begins in the middle parts of the ribs, such that highly efficient impact absorption characteristics are provided in which an essentially constant generated acceleration is maintained, and the stroke amount attributable to the deceleration slope may be eliminated, or in other words, the required rib height maybe further reduced.

Because the rib height may be reduced as described above, the amount of the garnish that projects into the vehicle interior may be reduced.

What is claimed is:

1. An impact-resistant material for vehicle interior that is obtained by molding a synthetic resin having a tan δ (loss tangent) peak height of 0.04 or higher and a peak temperature of −40° to 50° C., as measured through viscoelasticity measurement.

2. The impact-resistant material for vehicle interior according to claim 1, wherein the HDT (heat deformation temperature) of said synthetic resin under a 1.82 MPa stress is 70 to 120° C.

3. The impact-resistant material for vehicle interior according to claim 1 or 2, wherein said synthetic resin is selected from among polypropylene resins, rubber-enhanced styrene resins, polycarbonate resins, polyamide resins, polyester resins, polyphenylene ether resins, and an alloy resin composed of a combination of said resins.

4. The impact-resistant material for vehicle interior according to claim 3, wherein said alloy resin is selected from among alloy resins composed of polycarbonate resins and rubber-enhanced styrene resins, alloy resins composed of polyamide resins and rubber-enhanced styrene resins, and alloy resins composed of polyester resins, polycarbonate resins and rubber-enhanced styrene resins.

5. The impact-resistant material for vehicle interior according to claim 3 or 4, wherein said synthetic resin comprises a norbornane polymer, a styrene-isoprene-styrene block copolymer, a hydrogen-added styrene-isoprene-styrene block copolymer, a styrene-isobutylene-styrene block copolymer, an isoprene-isobutylene copolymer, a chloroprene copolymer, a (meth)acrylic ester resin, acrylonitryl-butadiene rubber, polyurethane, or silicone rubber.

6. The impact-resistant material for vehicle interior according to claim 1, 2, 3, 4 or 5, wherein said material comprises a surface member having a substantially C-shaped transverse cross-section, which is placed over the vehicle interior side of the vehicle panel leaving a gap therebetween, and a plurality of plate-shape ribs that protrude into said gap from the rear surface of said surface member that faces the vehicle panel, and wherein each plate-shape rib is independent of the others, extending between the side walls of the surface member in a direction crossing the longitudinal direction of the vehicle panel, and has deformation inducing means that, when impact is received from a passenger, causes the part that protrudes toward the vehicle panel to buckle in the middle part of the protrusion.

7. The impact-resistant material for vehicle interior according to claim 6, wherein the surface member is placed over the panel protrusion of the vehicle panel that protrudes into the interior of the vehicle with a gap therebetween, the protruding edge of each plate-shape rib has a configuration that at least substantially follows the configuration of the protrusion edge of said panel protrusion and of the passenger-side side face thereof that is continuous sideways therefrom, and wherein said deformation inducing means includes at least one main notch that opens at a position facing the edge at which the protrusion edge and the passenger-side side face of the panel protrusion abut on each other, and comprises a total of two or more components selected from among notches, steps and thin areas formed on said protrusion edge.

8. The impact-resistant material for vehicle interior according to claim 6 or 7, wherein said surface member and the plate-shape ribs are molded separately and assembled as a single unit using securing means such as clips, thermal caulking, an adhesive agent or two-sided adhesive tape.

9. The impact-resistant material for vehicle interior according to claim 1, 2, 3, 4, 5, 6, 7, or 8, wherein said material is a pillar garnish, roof side rail garnish or door waist garnish for an automobile.

10. The impact-resistant material for vehicle interior according to claim 6, 7, or 8, wherein said material is a front pillar garnish or center pillar garnish for an automobile.

11. An impact absorbing member for vehicle interior according to claim 1, wherein said member comprises a surface member having a substantially C-shaped transverse cross-section, which is placed over a vehicle interior side of a vehicle panel leaving a gap therebetween, and a plurality of plate-shape ribs that protrude into said gap from a rear surface of said surface member that faces the vehicle panel.

\* \* \* \* \*